United States Patent
McNeeley et al.

(10) Patent No.: US 12,164,217 B2
(45) Date of Patent: Dec. 10, 2024

(54) IMAGE PROJECTING SYSTEMS AND METHODS

(71) Applicant: NEWCO JODITO LLC, La Vergne, TN (US)

(72) Inventors: Carolyn McNeeley, Cleveland, OH (US); James Edward Szpak, Cleveland, OH (US); Danwei Ye, Cleveland, OH (US); Shawn Dellinger, Cleveland, OH (US); Anthony DeMore, Cleveland, OH (US); Stephen Caution, Hudson, OH (US); Daniel Karnadi, Shaker Heights, OH (US); Steve Izen, Shaker Heights, OH (US); David Rohler, Shaker Heights, OH (US)

(73) Assignee: Dittopatterns LLC, Le Vergne, TN (US)

( * ) Notice: Subject to any disclaimer, the term of this patent is extended or adjusted under 35 U.S.C. 154(b) by 719 days.

(21) Appl. No.: 17/318,708

(22) Filed: May 12, 2021

(65) Prior Publication Data

US 2021/0356849 A1    Nov. 18, 2021

Related U.S. Application Data

(60) Provisional application No. 63/129,336, filed on Dec. 22, 2020, provisional application No. 63/023,750, filed on May 12, 2020.

(51) Int. Cl.
*G03B 21/14* (2006.01)
*F16M 11/04* (2006.01)
(Continued)

(52) U.S. Cl.
CPC ......... *G03B 21/145* (2013.01); *F16M 11/046* (2013.01); *D05B 3/24* (2013.01); *D05B 35/12* (2013.01); *G01C 9/34* (2013.01)

(58) Field of Classification Search
CPC ........ G03B 21/145; D05B 3/24; D05B 35/12; D05B 79/00; F16M 11/046; G01C 9/34; G01C 9/28
See application file for complete search history.

(56) References Cited

U.S. PATENT DOCUMENTS

| 943,326 A | 12/1909 | Thurstone |
| 2,053,073 A | 9/1936 | Gardner |

(Continued)

FOREIGN PATENT DOCUMENTS

| CN | 203930320 U | * 11/2014 | ............. G03B 29/00 |
| EP | 3287986 | 2/2018 | |

OTHER PUBLICATIONS

"Baby Lock—Solaris," webpage https://babylock.com/machines/sewing/solaris, 14 page, Aug. 15, 2020, retrieved from Internet Archive Wayback Machine https://web.archive.org/web/20200815100401/https://babylock.com/machines/sewing/solaris on Oct. 18, 2023.

(Continued)

*Primary Examiner* — Magda Cruz
(74) *Attorney, Agent, or Firm* — Hahn Loeser & Parks LLP; Daniel J. Smola

(57) ABSTRACT

A projection system for projecting sewing patterns onto a surface comprises a vertical beam, a projector, and a cart. The vertical beam includes (a) a floor engaging portion at a bottom end and (b) a ceiling engaging portion at a top end, the ceiling engaging portion being vertically movable with respect to the floor engaging portion such that, when in use, the floor engaging portion and the ceiling engaging portion engage a floor and a ceiling, respectively, to anchor the (Continued)

projection system adjacent the surface. The projector is configured to receive data representing the sewing patterns and to project the sewing patterns. The cart is operably attached to the projector and slidably attached to the vertical beam, wherein sliding the cart vertically adjusts a height of the projector above the surface.

23 Claims, 39 Drawing Sheets

(51) Int. Cl.
　　 *D05B 3/24* (2006.01)
　　 *D05B 35/12* (2006.01)
　　 *G01C 9/34* (2006.01)

(56) References Cited

U.S. PATENT DOCUMENTS

| | | |
|---|---|---|
| 3,805,650 A | 4/1974 | Pearl |
| 3,949,629 A | 4/1976 | Johnson |
| 4,590,881 A | 5/1986 | Wada |
| 4,739,487 A | 4/1988 | Bonnet et al. |
| 4,905,159 A | 2/1990 | Loriot |
| 4,941,183 A | 7/1990 | Bruder et al. |
| 5,095,835 A | 3/1992 | Jernigan et al. |
| 5,195,442 A | 3/1993 | Meier |
| 5,195,451 A | 3/1993 | Nakashima |
| 5,205,232 A | 4/1993 | Sadeh et al. |
| 5,323,722 A | 6/1994 | Goto et al. |
| 5,615,318 A | 3/1997 | Matsuura |
| 5,663,885 A | 9/1997 | Stahl |
| 5,831,857 A | 11/1998 | Clarino et al. |
| 6,029,141 A | 2/2000 | Bezos et al. |
| 6,042,066 A | 3/2000 | Maharg et al. |
| 6,161,491 A | 12/2000 | Takenoya et al. |
| 6,173,211 B1 | 1/2001 | Williams et al. |
| 6,219,099 B1 | 4/2001 | Johnson et al. |
| 6,301,518 B1 | 10/2001 | Kawaguchi |
| 6,379,011 B1 | 4/2002 | Knox |
| 6,434,444 B2 | 8/2002 | Herman |
| 6,554,235 B1 | 4/2003 | Fortier |
| 6,558,006 B2 | 5/2003 | Ioka |
| 6,570,623 B1 | 5/2003 | Li et al. |
| 6,612,533 B2 | 9/2003 | Biles et al. |
| 6,618,076 B1 | 9/2003 | Sukthankar et al. |
| 6,753,907 B1 | 6/2004 | Sukthankar et al. |
| 6,792,865 B2 | 9/2004 | Brunet-Manquat |
| 6,824,271 B2 | 11/2004 | Ishii et al. |
| 6,834,965 B2 | 12/2004 | Raskar et al. |
| 6,846,081 B2 | 1/2005 | Mochizuki et al. |
| 6,856,843 B1 | 2/2005 | Herman, Jr. |
| 6,859,679 B1 | 2/2005 | Smith et al. |
| 7,018,050 B2 | 3/2006 | Ulichney et al. |
| 7,125,122 B2 | 10/2006 | Li et al. |
| 7,144,115 B2 | 12/2006 | Li |
| 7,149,337 B2 | 12/2006 | Michaelis et al. |
| 7,175,285 B2 | 2/2007 | Li et al. |
| 7,212,880 B2 | 5/2007 | Mizuno et al. |
| 7,237,907 B2 | 7/2007 | Li et al. |
| 7,306,341 B2 | 12/2007 | Chang |
| 7,338,411 B2 | 3/2008 | Blacker |
| 7,716,143 B2 | 5/2010 | Shemula |
| 7,763,836 B2 | 7/2010 | Webb et al. |
| 7,813,823 B2 | 10/2010 | Torrini et al. |
| 7,814,832 B2 | 10/2010 | Franz |
| 7,845,259 B2 | 12/2010 | Workman et al. |
| 7,972,018 B2 | 7/2011 | Sajadi et al. |
| 8,045,006 B2 | 10/2011 | Miceli |
| 8,116,895 B2 | 2/2012 | Fernandez |
| 8,297,757 B2 | 10/2012 | Kubota |
| 8,311,366 B2 | 11/2012 | Schiewe et al. |
| 8,382,291 B2 | 2/2013 | Kubota |
| 8,406,562 B2 | 3/2013 | Bassi et al. |
| 9,107,462 B1 | 8/2015 | Heinrich et al. |
| 9,267,222 B2 | 2/2016 | Schnaufer et al. |
| 9,325,956 B2 | 4/2016 | Grundhofer |
| 9,378,593 B2 | 6/2016 | Chhugani et al. |
| 9,406,170 B1 | 8/2016 | Grampurohit et al. |
| 9,462,838 B1 | 10/2016 | Smith et al. |
| 9,650,734 B2 | 5/2017 | Elliott et al. |
| 9,791,267 B2 | 10/2017 | Bismuth et al. |
| 9,852,533 B2 | 12/2017 | Harvill |
| 9,949,519 B2 | 4/2018 | Koh |
| 9,992,464 B1 | 6/2018 | Urquhart et al. |
| 10,044,998 B2 | 8/2018 | Takasu et al. |
| 10,057,556 B2 | 8/2018 | Grundhofer et al. |
| 10,089,778 B2 | 10/2018 | Moule et al. |
| 10,143,253 B2 | 12/2018 | Faupel |
| 10,176,617 B2 | 1/2019 | Harvill |
| 10,225,464 B2 | 3/2019 | Narikawa |
| 10,228,682 B2 | 3/2019 | Colaianni et al. |
| 10,401,145 B2 | 9/2019 | Hoeller et al. |
| 10,482,642 B2 | 11/2019 | Choi et al. |
| 10,574,956 B2 | 2/2020 | Moule et al. |
| 10,602,102 B2 | 3/2020 | Ishikawa et al. |
| 10,750,810 B2 | 8/2020 | Caven |
| 10,819,964 B2 | 10/2020 | Narikawa et al. |
| 10,958,883 B2 | 3/2021 | Narikawa |
| 11,003,903 B2 | 5/2021 | Caven |
| 11,583,021 B2 | 2/2023 | Caven |
| 2002/0002416 A1 | 1/2002 | Herman, Jr. |
| 2003/0006354 A1* | 1/2003 | Biles ............... F16M 13/02 248/354.1 |
| 2006/0242687 A1* | 10/2006 | Thione ............. G06F 21/445 726/4 |
| 2010/0089103 A1 | 4/2010 | Zorzolo |
| 2013/0049938 A1 | 2/2013 | Hooke |
| 2014/0006124 A1 | 1/2014 | Lindensmith |
| 2014/0034797 A1 | 2/2014 | Markwardt |
| 2014/0114620 A1 | 4/2014 | Grinspun et al. |
| 2016/0140766 A1 | 5/2016 | Balachandreswaran et al. |
| 2016/0183617 A1 | 6/2016 | Mckinney |
| 2017/0032403 A1 | 2/2017 | Caven |
| 2017/0053447 A1 | 2/2017 | Chen et al. |
| 2017/0200313 A1 | 7/2017 | Lee et al. |
| 2017/0255291 A1 | 7/2017 | Hinson et al. |
| 2019/0191804 A1* | 6/2019 | Caven ............... A41H 3/08 |
| 2020/0383413 A1* | 12/2020 | Caven ............... A41H 3/08 |
| 2021/0072626 A1* | 3/2021 | Tippin ............... G03B 21/10 |

OTHER PUBLICATIONS

Extended European Search Report regarding EP21803924.6, Dated Apr. 16, 2024 (10pgs.).
Camelia's Sewing Channel: "Using a projector for PDF sewing patterns, All you need to know and how it works", URL:https://www.youtube.com/watch?v=pD4_q7k5ux0, online publication date Jan. 27, 2020, XP93148116. (2 pgs.).
Elle An d Mac Patterns, "Intro to Projectors for Sewing," UURL:https://www.youtube.com/watch?v=t60sHf50lw8, online publication date Jan. 27, 2020, XP93148115 (2 pgs.).
Uniprof24: "TV-Halterung-Stange, TV-Raumteiler drehbar, TV Stange Solo Uniprof24", Feb. 22, 2018 (Feb. 22, 2018), XP093148135, URL:https://www.youtube.com/watch?v=Qb1B8k WAmjO.

* cited by examiner

IMAGE PROJECTING SYSTEMS AND METHODS

This patent application claims priority to and benefit of U.S. Provisional Application No. 63/023,750, filed May 12, 2020, and U.S. Provisional Application No. 63/129,336, filed Dec. 22, 2020, which are all incorporated herein by reference.

BACKGROUND

In sewing and fashion design, a pattern is the template from which the parts of a garment or other item are traced onto fabric before being cut out and assembled. Conventional patterns are usually made of paper, typically tissue paper, tracing paper, printer paper, and the like. Typically, a sewist (i.e., the artist who sews the item) obtains a sewing pattern packet that includes pattern pieces printed on paper.

The larger pattern may be cut into the pattern pieces corresponding to the different parts (e.g., front, sleeve, pocket, etc.) of the item. The printed pattern pieces, after being cut out, may then be either pinned or weighted down onto the fabric. The sewist may then cut along the outline of each paper pattern piece to make the corresponding fabric piece.

Typically, multiple sizes (e.g., small, medium, large) of the item to be sewn are printed on the same paper and the sewist selects a proper size to cut out. Once the proper size is cut out from the full pattern sheet, it is typically not possible to reuse the other sizes in the pattern. Also, if a sewist wishes to recreate a design at a later date using the same pattern, they must have saved all paper pattern pieces.

To address some of these issues, digital patterns are now available. Typically, a sewist purchases the digital pattern and prints the pattern on paper. For example, the sewist may print the pattern layout at home on several 8.5"×11" pages and, thereafter, tape the pages together to form the desired pattern. At this point, the sewist may proceed to cut out the pattern pieces and further proceed as described above.

But conventional printed digital patterns still suffer from some of the problems of conventional paper patterns because they still require paper. For example, paper patterns (traditional paper or digital) make it difficult to position the print of a fabric (such as, for example, a flower print) in a specific location because the pattern paper covers the print. Moreover, traditional paper as well as printed digital patterns are cumbersome, easily ripped, and difficult to store.

Cutting mats were invented to improve the pattern cutting experience. In combination with a cutting mat, a sewist may use a rotary cutter instead of scissors. With a cutting mat below the pattern pinned or weighted onto fabric, the sewist could work directly over top and roll-cut along the pattern parameter. However, in conventional cutting mats, pieces of fabric could slide or move during this cutting process.

BRIEF SUMMARY OF THE INVENTION

In accordance with one aspect of the invention, the present disclosure discloses a projection system designed to accurately project all required sewing pattern lines and notations and even instructions directly onto the material to be sewn. Patterns may be projected onto many different types of materials such as fabric, canvas, felt, leather, paper, carpet, etc. The projected patterns are easily digitally storable, fully reusable, and do not obstruct view of the fabric or other material being sewn.

Secondarily, the projection system disclosed herein may project onto a surface not intended to be cut, but rather intended to be traced onto and then painted, etched, carved, sculpted, etc. The projector may also project patterns and images in general onto a floor, table, ceiling, or wall.

The projection system disclosed herein may include a vertical powered beam that allows for easy projector height adjustment and projection onto a horizontal surface such as a floor or table.

The projection system disclosed herein may also include a cutting mat underlay that effectively prevents pieces of fabric from sliding or moving during the cutting process.

In one example, a projection system for projecting sewing patterns onto a surface comprises a vertical beam, a projector, and a cart. The vertical beam includes (a) a floor engaging portion at a bottom end and (b) a ceiling engaging portion at a top end, the ceiling engaging portion being vertically movable with respect to the floor engaging portion such that, when in use, the floor engaging portion and the ceiling engaging portion engage a floor and a ceiling, respectively, to anchor the projection system adjacent the surface. The projector is configured to receive data representing the sewing patterns and to project the sewing patterns. The cart is operably attached to the projector and slidably attached to the vertical beam, wherein sliding the cart vertically adjusts a height of the projector above the surface.

The cart or the vertical beam may include a cart locking mechanism operable between a locked mode in which the cart locking mechanism resists vertical sliding of the cart along the vertical beam and a sliding mode in which the cart locking mechanism does not resist vertical sliding of the cart along the vertical beam. In another example, the cart has a friction fit with the vertical beam in which the friction resists vertical sliding of the cart along the vertical beam.

The projection system may further include a computing device having a plurality of patterns stored thereon. The computing device may communicate selected patterns to the projector for projection. The patterns stored on the computing device may comprise at least one calibration pattern and at least one sewing pattern. The computing device may be configured to connect to a Wi-Fi access point on a computer network, and the computing device may further be configured to connect to the projector via a Bluetooth interface and provide credentials for the Wi-Fi access point to the projector via the Bluetooth interface. In this example, the computing device is configured to transmit patterns to the projector via the Wi-Fi access point.

The vertical beam may include an electrical power path that transfers electrical power along the length of the vertical beam to the cart, the electrical power path including electrical rails that transfer electrical power to the cart while allowing vertical sliding of the cart along the vertical beam, and wherein the cart couples the electrical power to the projector. In this example, the vertical beam may include a power switch configured to interrupt electrical power flow to the projector.

The projector may be rotatably attached to the cart or the vertical beam and rotation of the projector to an angle of rotation relative to the cart disconnects the projector from the cart. The projector may be rotatably attached to the cart such that the projector is rotatable from a vertical orientation in which an axis of projection is parallel to a length of the vertical beam to a horizontal orientation in which the axis of projection is perpendicular to the length of the vertical beam.

The projection system may further comprise a spirit level slidably attached to the vertical beam and configured to slide vertically along the vertical beam, the spirit level configured to indicate whether the vertical beam is plumb.

The vertical beam may be separable into two portions to facilitate storage or transport of the projection system.

The vertical beam may further comprise a spring-biased telescoping portion to bias the vertical beam against the floor and ceiling. The floor engaging portion may be disposed on the spring-biased telescoping portion.

The projection system may further comprise a cutting mat having visible features for assisting in positioning of the projector at a desired distance from the surface. The computing device may be configured to cause the projector to project a calibration pattern onto the visible features for assisting in positioning of the projector at a desired distance from the surface.

The projection system may further comprise a computing device having a transform library stored thereon, wherein the computing device applies a projector transform from the transform library to a selected pattern prior to communicating the transformed selected pattern to the projector for projection. The computing device may generate the projector transform from a camera image including first optical features from a physical calibration guide and second optical features from a projected calibration pattern.

These and other advantages of the invention will become apparent when viewed in light of the accompanying drawings, examples, and detailed description.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
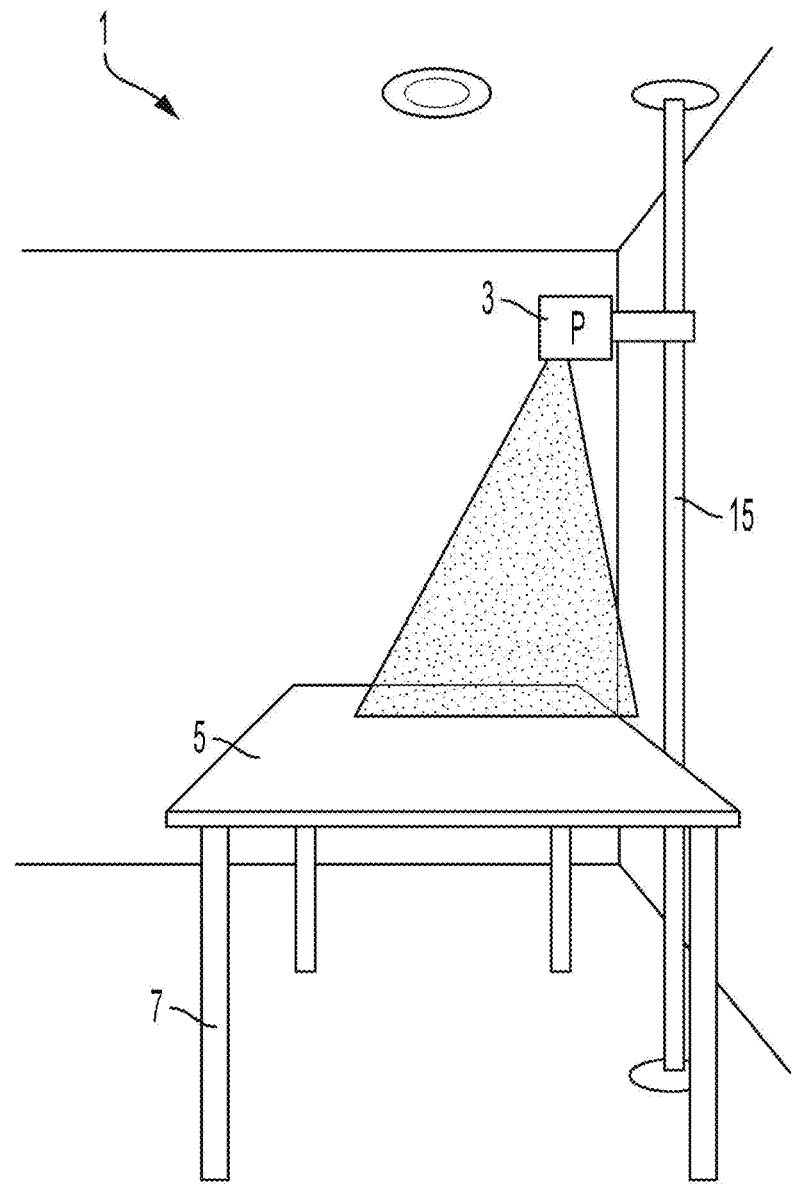
FIG. 1 illustrates a perspective view of an exemplary projection system for projecting sewing patterns onto fabric.

FIG. 1 illustrates a perspective view of a projection system 1 for projecting sewing patterns onto fabric. The system 1 includes a projector 3 that receives data representing sewing patterns and projects the sewing patterns onto fabric disposed on a horizontal surface 5 (top surface of table 7) vertically below the projector 3. The projection system 1 is generally related to a concept described in U.S. patent application Ser. No. 15/853,807, filed on Dec. 24, 2017, now U.S. Pat. No. 10,750,810, which is hereby incorporated by reference in its entirety. Also, U.S. patent application Ser. No. 16/350,932, now U.S. Pat. No. 11,003,903 concerns formatting electronic sewing patterns and making them available to customers and is also incorporated by reference. Although for ease of explanation inventions are disclosed herein in the context of sewing patterns, some if not all of the inventions disclosed herein have applicability in contexts other than sewing patterns and, thus, those inventions should not be so limited.

Figure 2:
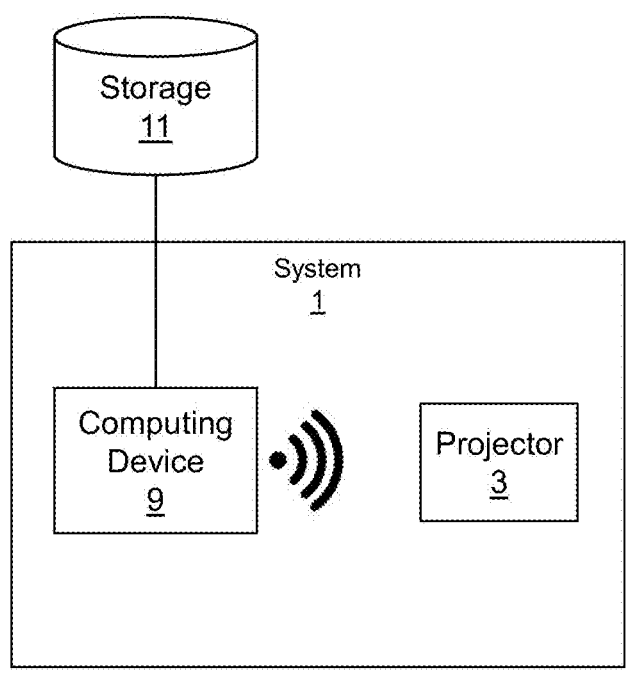
FIG. 2 illustrates a block diagram of the exemplary system of FIG. 1.

FIG. 2 illustrates a block diagram of the exemplary system 1. The system 1 may include the projector 3 and a computing device 9. The computing device 9 may correspond to a laptop computer, tablet, or smartphone. The computing device 9, in some embodiments, is configured with one or more sets of instructions or logic which, when executed by the computing device, cause the computing device 9 to perform or otherwise execute the functions attributed herein to the computing device 9.

The computing device is operably connected to the projector 3. In some embodiments, the computing device is operably connected to the projector 3 via one or more wireless data connections, such as Wi-Fi, Bluetooth or other wireless technology, or a combination thereof. In one example, the computing device 9 is wirelessly connected to a Wi-Fi access point. The computing device 9 is first paired with the projector 3 using Bluetooth. On one example, the computing device prompts a user to enter Wi-Fi credentials. In another, the computing device 9 accesses the credentials that it used to connect to the Wi-Fi access point. The computing device 9 then transfers Wi-Fi connection credentials to the projector 3 over the Bluetooth connection. Once the projector has the Wi-Fi credentials, it logs into the Wi-Fi access point and the computing device 9 and projector 3 communicate with each other over a computer network. This reduces or eliminates any need to provide a user interface on the projector 3 itself to configure the projector 3 for wireless communications.

In some embodiments, the computing device may include a projector. In such embodiments, an operator may project the desired sewing pattern template from the computing device 9. The sewing pattern may be generated using augmented reality (AR) content that changes corresponding to a change in space or a user's movement, captured through a camera system.

Figure 3:
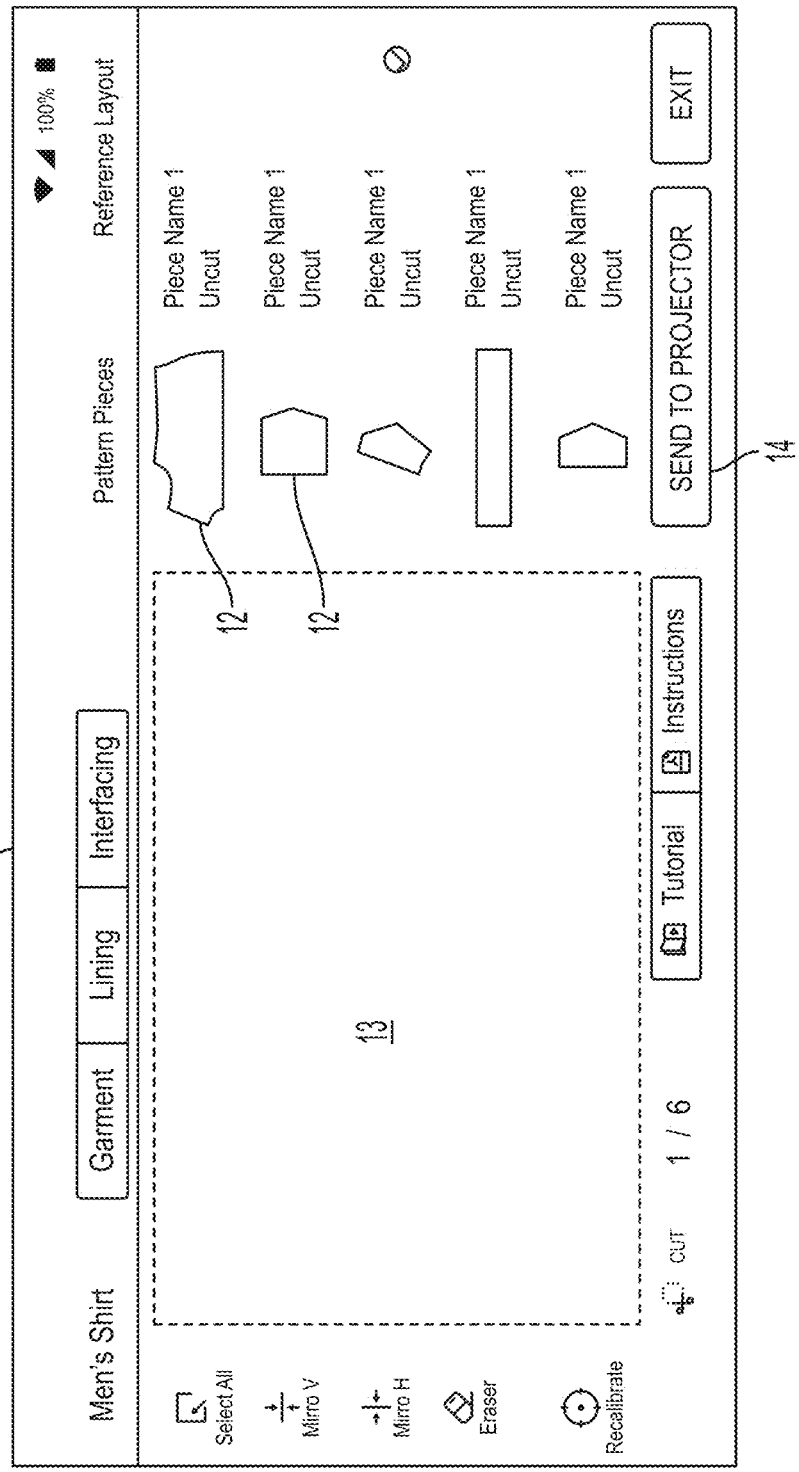
FIG. 3 illustrates an exemplary user interface of the computing device of the exemplary system of FIG. 1.
Figure 4:
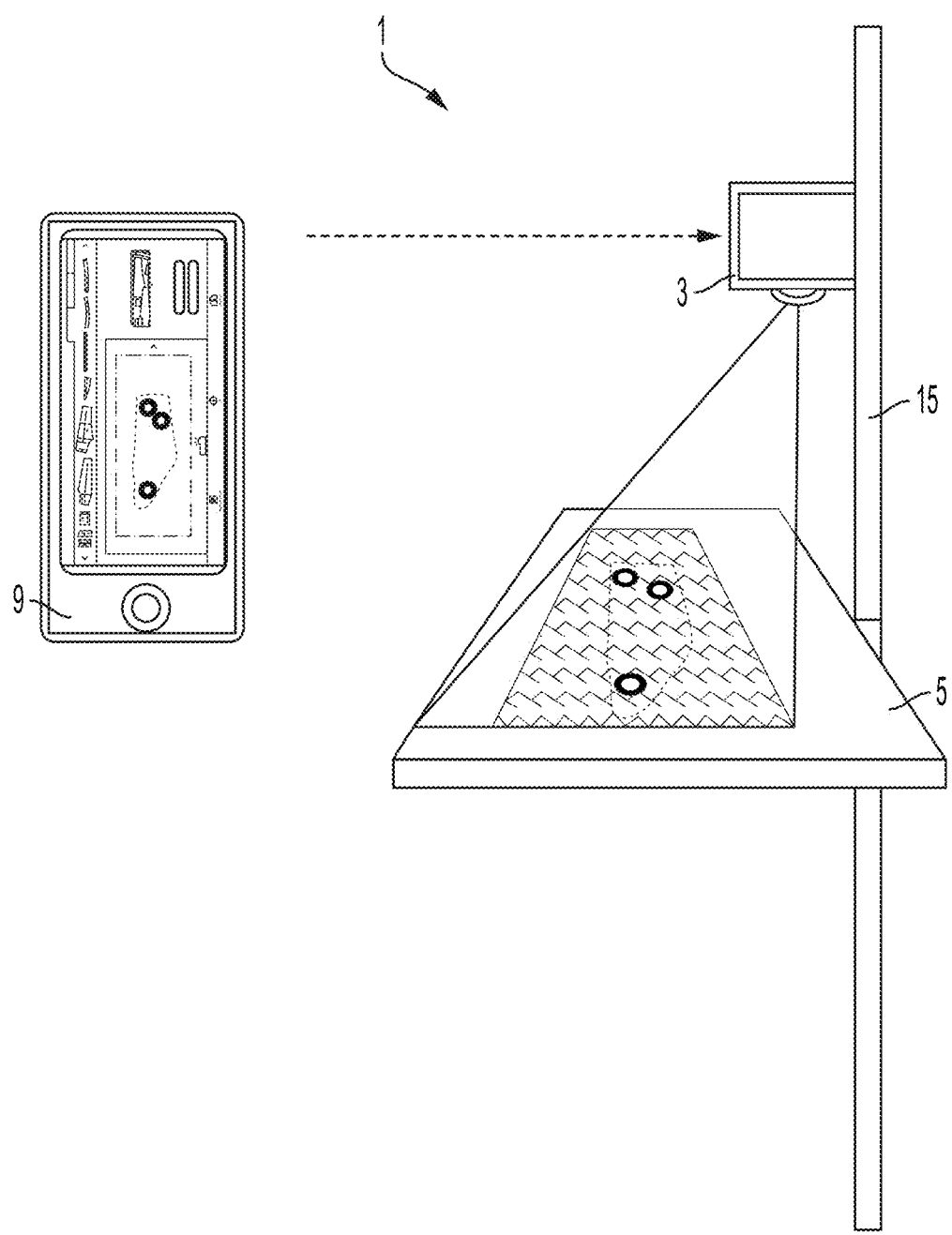
FIG. 4 illustrates a perspective view of the exemplary projection system of FIG. 1 in operation.

FIG. 3 illustrates an exemplary user interface which is displayed on a display of the computing device 9. Images of sewing patterns to be sewn may be stored in a storage 11, which may correspond to a storage of the computing device 9 or remote (i.e., cloud) storage for access by the computing device 9 or a combination thereof. A user may select, via the user interface of the computing device 9, specific pattern pieces 12 by, for example, moving the desired piece onto a projector workspace 13 representing the projector's field of projection onto the horizontal surface 5. Advantageously, if multiple pieces are required from the same pattern piece, multiple copies of a pattern piece may be moved onto the projector workspace 13. Pattern pieces may also be mirrored. This allows the sewist to cut pieces at the same time, and also allows the sewist to make a "cut on fold" piece without having to cut a physically folded material. In some embodiments, a "Send to Projector" 14 is included. Upon selection and placement of pattern pieces 12 within the workspace, and optionally after activation of button 14, the computing device 9 may send the selected pattern(s) on the workspace 13 to the projector 3 for projection onto the horizontal surface 5 as exemplarily shown in FIG. 4.

As described below, the system 1 may be used to project sewing patterns onto fabric. Because there is no paper pattern covering the fabric, the sewist can view how a printed or woven visual pattern in the fabric will appear on a finished product. The sewist may adjust locations of the projected pattern pieces in the workspace 13 to, for example, align patterns at seams, avoid potentially undesirable pattern feature locations, etc. Thereafter, the sewist may interact with the projected image to cut the fabric, in accordance to the projected sewing pattern.

A significant challenge for the system 1 is the positioning of the projector 3 above the horizontal surface 5. The projector should be held securely in place, even while the sewist moves about system 1, coming into contact with its components. Returning to FIG. 1, the system 1 includes a vertical beam 15 to which the projector 3 is mounted to adjustably position the projector 3 above the horizontal surface 5 and, thus, the fabric to be cut.

Figure 5:
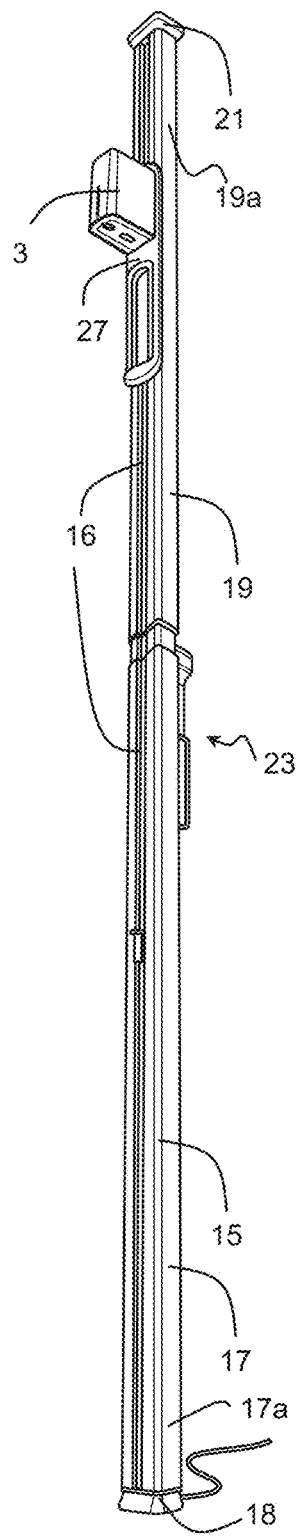
FIG. 5 illustrates a perspective view of an exemplary vertical beam.
Figure 18:
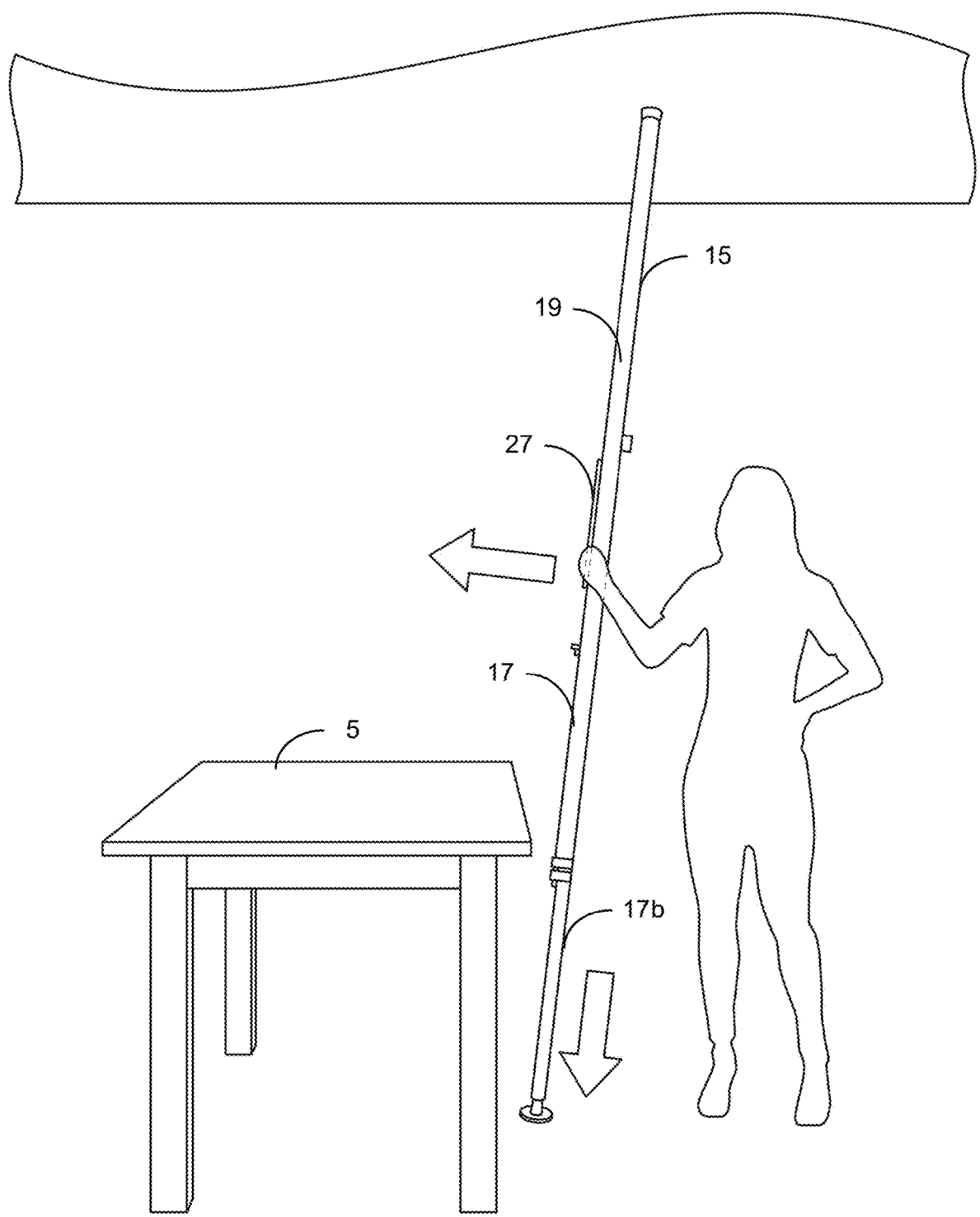
FIGS. 18-22 illustrate exemplary methods for setting up a projection system.
Figure 19:
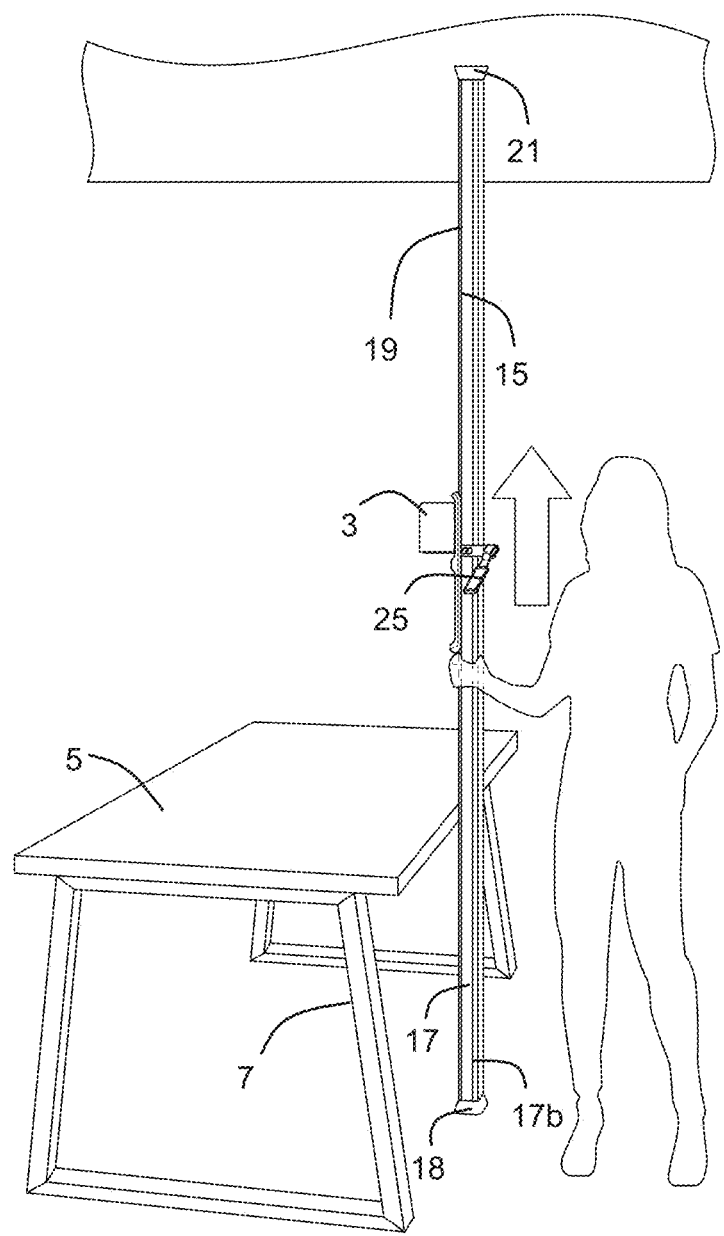

FIG. 5 illustrates a perspective view of an exemplary vertical beam 15. FIGS. 6-9 illustrate magnified perspective, front, rear, and side views, respectively, of the exemplary vertical beam 15. The vertical beam 15 includes a lower beam portion 17 including a floor engaging portion 18 at a bottom end 17a. The vertical beam 15 also includes an upper beam portion 19 including a ceiling engaging portion 21 at a top end 19a. In some embodiments, the upper beam portion 19 moves longitudinally with respect to the lower beam portion 17 and vice versa to longitudinally extend the vertical beam 15 so that pressure is exerted against the floor by the floor engaging portion and against the ceiling by the ceiling engaging portion 21 to anchor the vertical beam 15. As explained in detail below, the vertical beam 15 may also include a beam locking mechanism 23 for releasing, extending, and locking of the vertical beam 15. In some embodiments, as shown in FIGS. 18 and 19, the vertical beam 15 and specifically the lower beam portion 17 includes a telescoping portion 17b that telescopes downwardly from the lower beam portion 17 such that the vertical beam 15 may be used with ceilings of various different heights.

Figure 10A:
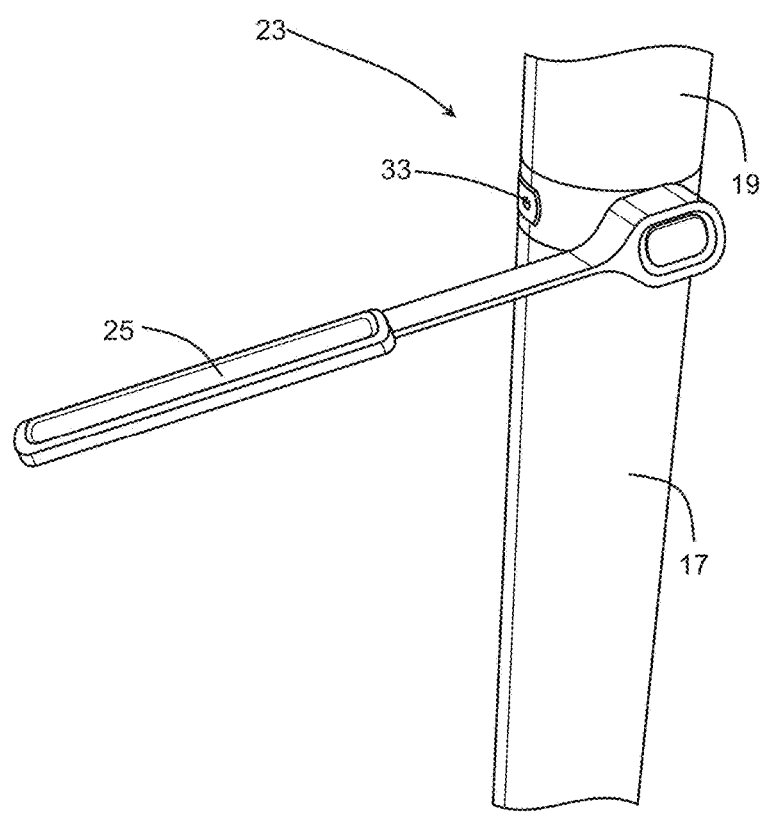
FIGS. 10A and 10B illustrate magnified perspective views of a beam locking mechanism in the unlocked and locked positions, respectively.
Figure 10B:
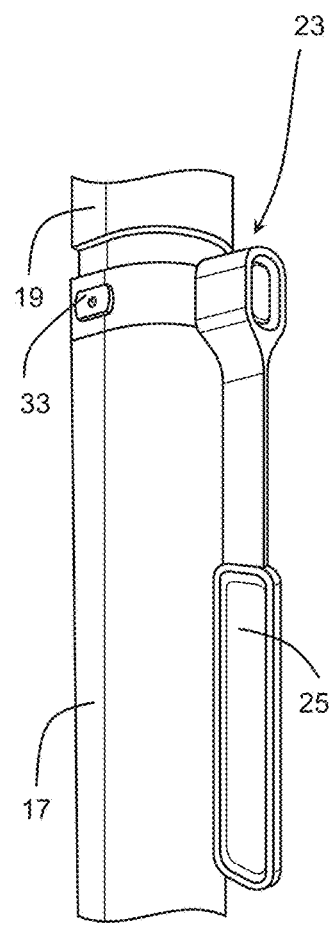
Figure 29:
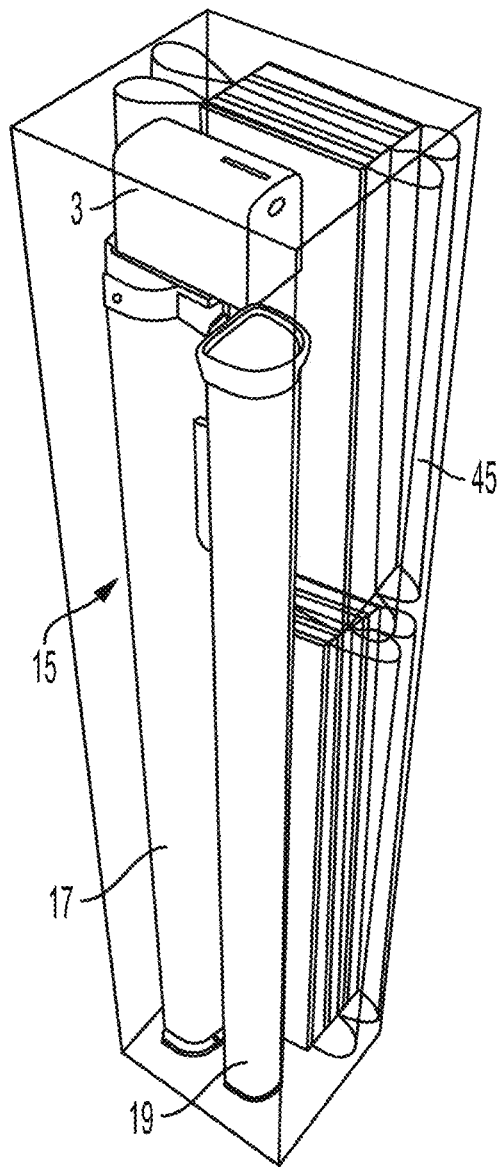
FIG. 29 illustrates the exemplary projection system of FIG. 1 disassembled and packaged for transport together with the exemplary cutting mat underlay of FIGS. 27A-27B.

FIGS. 10A and 10B illustrate magnified perspective views of the beam locking mechanism 23 in the unlocked and locked positions, respectively. The beam locking mechanism 23 may include a lever operably connected to a camming mechanism. In the unlocked position of FIG. 10A, the beam locking mechanism 23 unlocks (i.e., releases) the vertical beam 15; the telescoping portion 17b (see FIG. 19), for example, may freely telescope downwardly from the lower beam portion 17. When transitioning the lever 25 from the unlocked position of FIG. 10A to the locked position of FIG. 10B, beam locking mechanism 23 locks the telescoping portion 17b, further longitudinally extends the beam 15 by longitudinally moving the upper beam portion 19 with respect to the lower beam portion 17 (e.g., about ½ inch), and eventually locks the upper beam portion 19 to the lower beam portion 17. This action anchors the vertical beam 15 to the floor and ceiling. In the opposite direction, operation of the lever 25 transitions the beam locking mechanism 23 from the locked position of FIG. 10B to the unlocked position of FIG. 10A to a) release the upper beam portion 19 from the lower beam portion 17 and also to b) release the telescoping portion 17b so it is free to telescope back into the lower beam portion 17. This action releases the longitudinal tension along the vertical beam 15 and, thus, unanchors the vertical beam 15. As shown in FIG. 29, the lower beam portion 17 is also separable from the upper beam portion 19 so that the disassembled beam 15 becomes very compact for packaging and storage. Therefore, the vertical beam 15 is easily assembled, installable, removable, repositionable, and portable.

Figure 30:
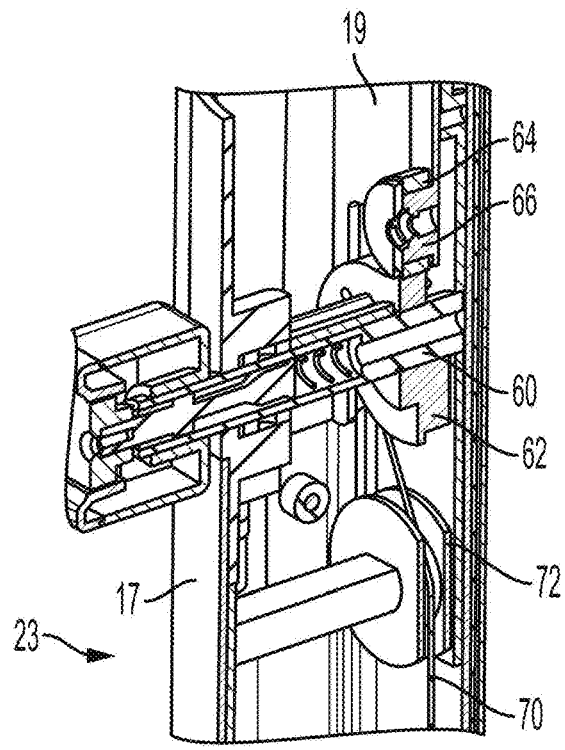
FIG. 30 illustrates an exemplary locking mechanism.
Figure 30:
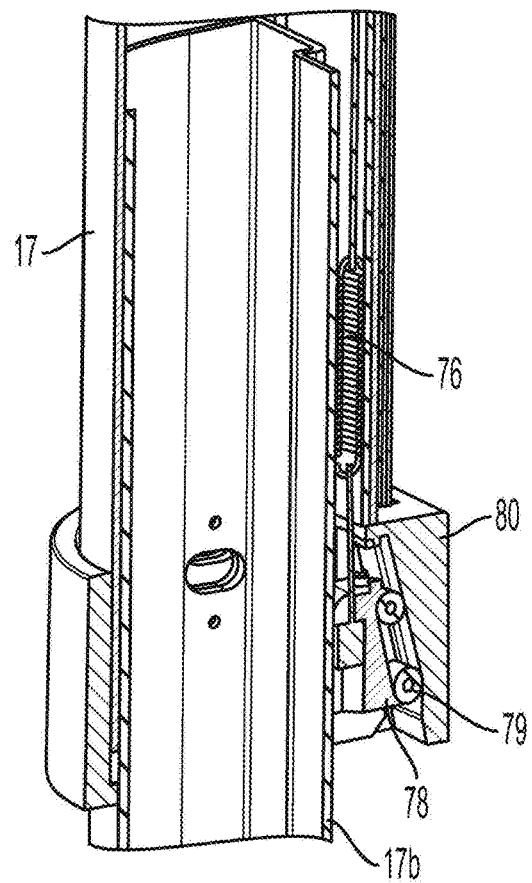
Figure 31:
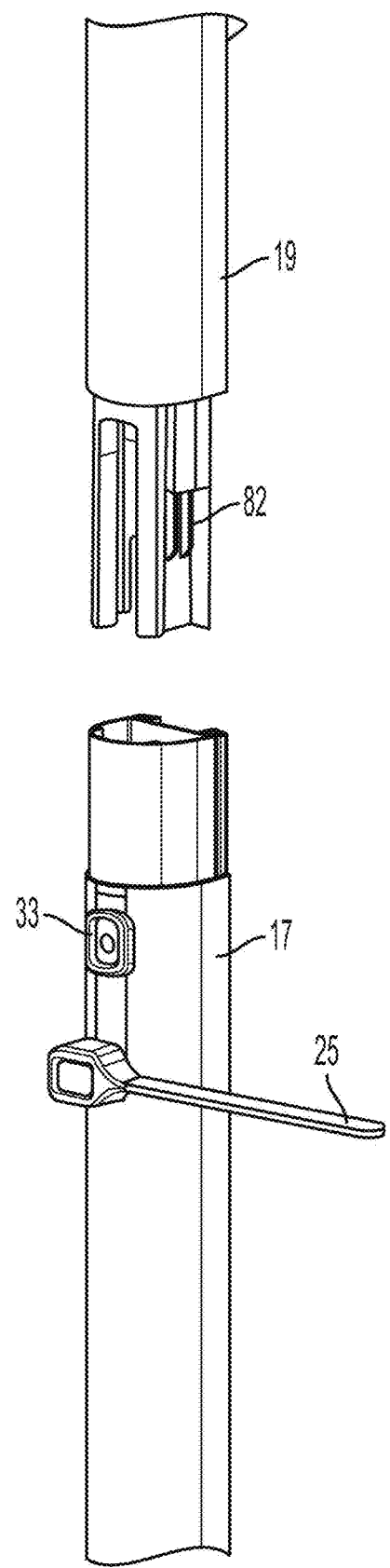
FIG. 31 illustrates separated upper and lower beam portions.
Figure 33:
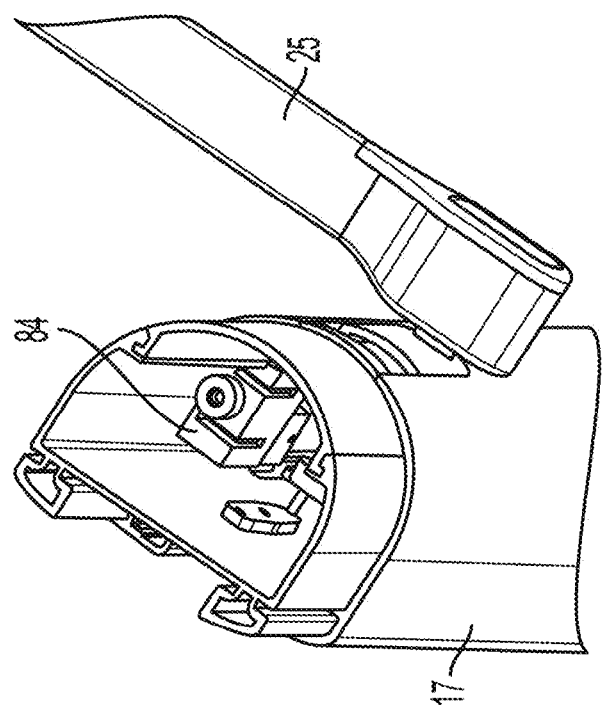
FIG. 33 illustrates features of an electrical power path on the lower beam portion.
Figure 32:
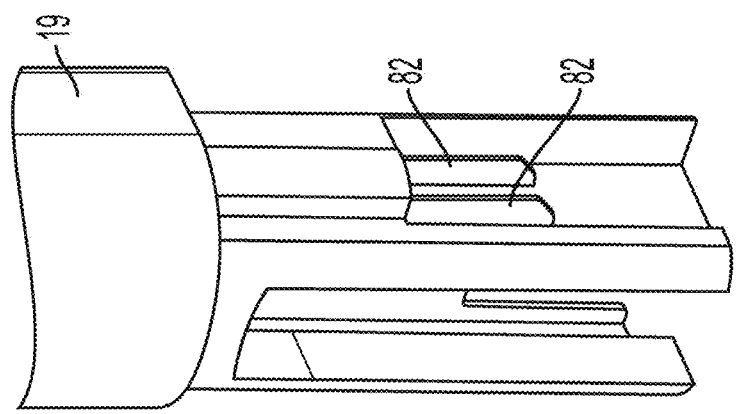
FIG. 32 illustrates features of an electrical power path on the upper beam portion.
Figure 34:
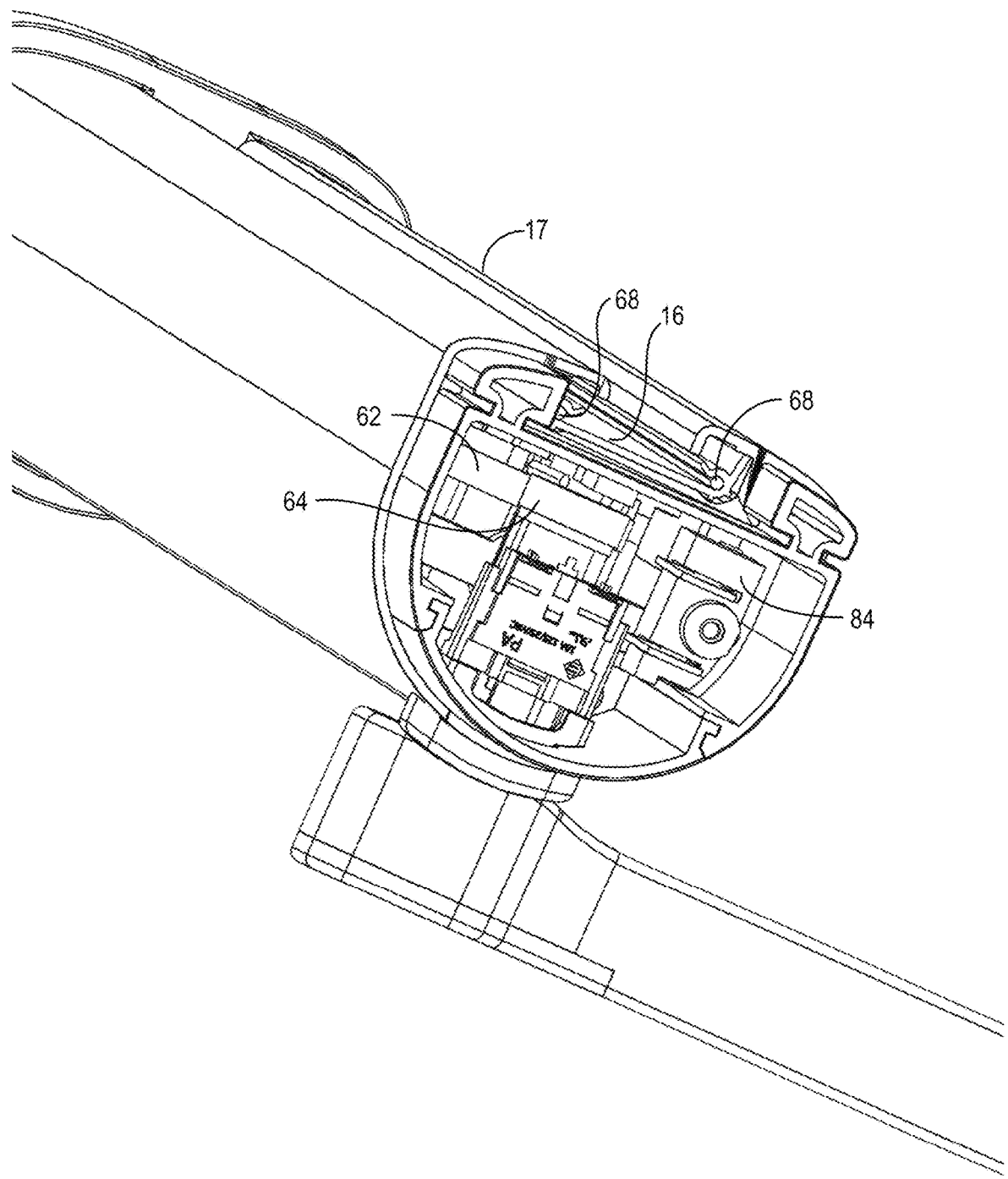
FIG. 34 illustrates additional features of connections of the lower beam portion.

Details of one example of a locking mechanism 23 are illustrated in FIG. 30. Lever 25 (FIG. 31) is connected to camshaft 60 on which cam 62 is mounted. Cam roller 64 is mounted on a shaft 66 of the upper beam portion 19 and engages the cam 62. A cable 70 wraps at least partially around cam 62 and extends downwardly to an idler bearing 72 mounted on an idler shaft 74. This redirects the cable 70 to be close to a side of the lower beam portion 17. Cable 70 extends downwardly to a spring 76. Spring 76 is connected or coupled to a wedge 78. Wedge 78 is located between the telescoping portion 17b and a collar 80 mounted on the bottom end 17b of the lower beam portion 17. Wedge 78 may have rollers 79 facing the collar 80. The rollers 79 allow wedge 78 to move freely with respect to the collar 80, yet still friction lock with the telescoping portion 17b.

When in the unlocked position, a portion of the cam 62 engaging or proximate to the cam roller 64 is flat or has a relatively constant radius. During initial movement of the lever 25, cam 62 takes up cable 70, moving the wedge 78 into contact between the collar 80 and telescoping portion 17b. While this initial movement of the wedge 78 occurs, cam 62 is not pushing the cam roller 64 upwards. This allows the telescoping section to be locked before the ceiling engaging portion 21 of the upper beam portion 19 exerts force against the ceiling. As the lever is rotated more towards the locked position, the cable 70 continues to be taken up on the cam 62 while tensioning the spring 76. This exerts additional locking force on wedge 78 while not requiring the wedge 78 to continue to move. The portion of cam 62 proximate to or engaging the cam roller 64 increases in radius, urging cam roller 64 upward, which also urges the upper beam portion 19 and ceiling engaging portion upward to engage the ceiling.

Figure 6:
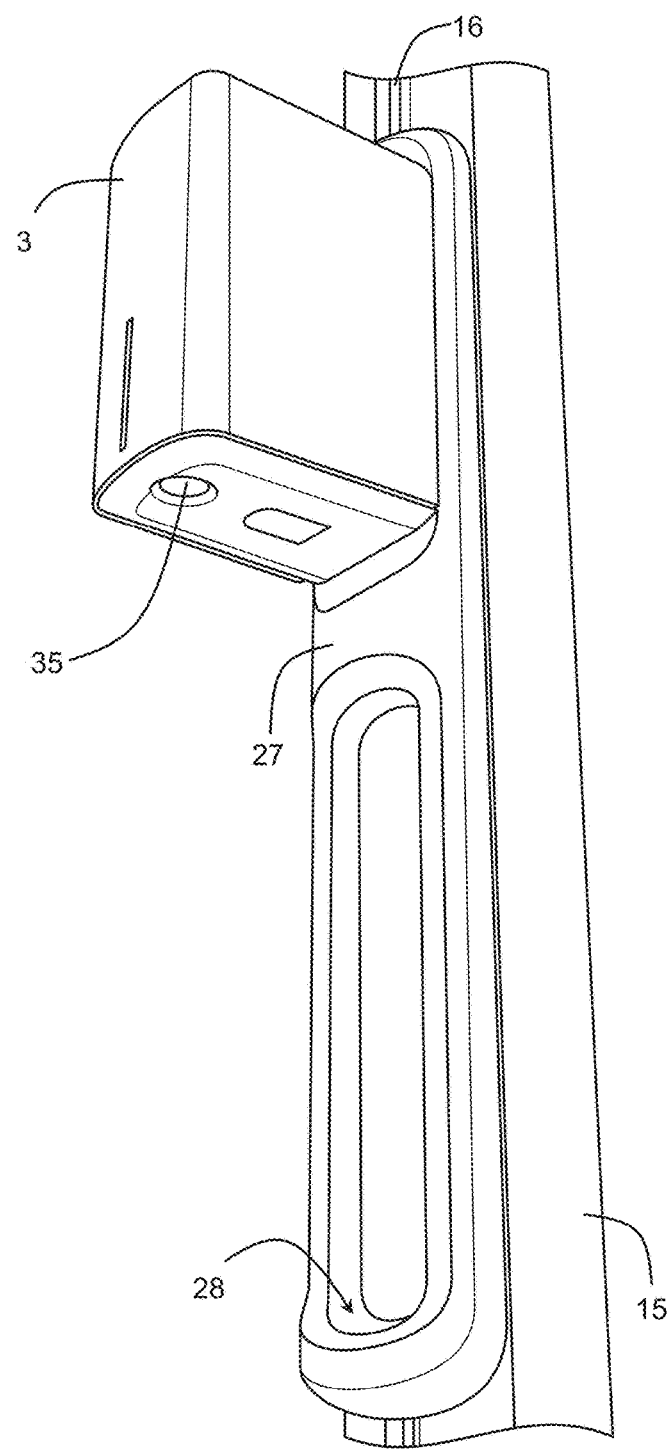
FIGS. 6-9 illustrate magnified perspective, front, rear, and side views, respectively, of the exemplary vertical beam of FIG. 5.
Figure 7:
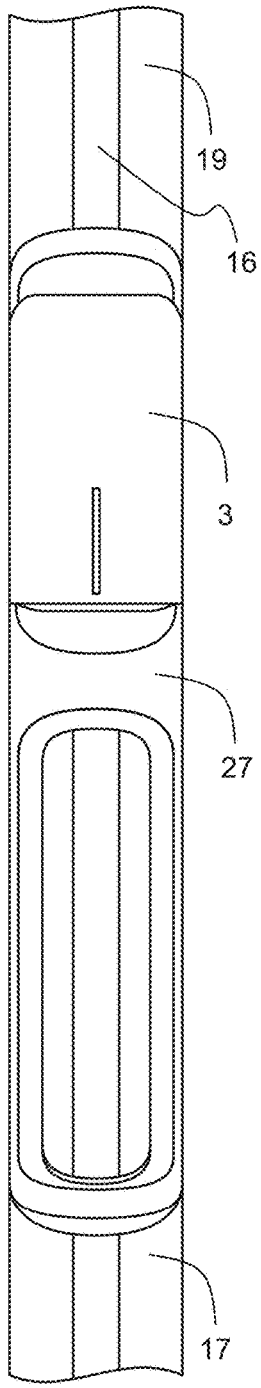
Figure 8:
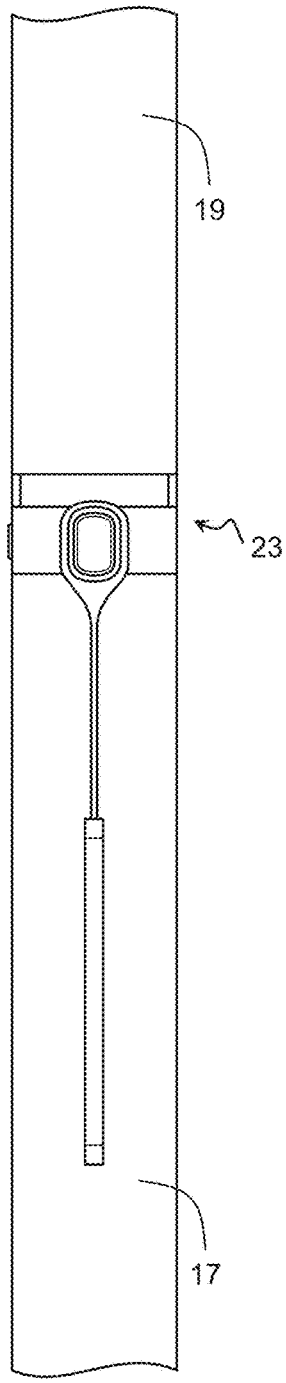
Figure 9:
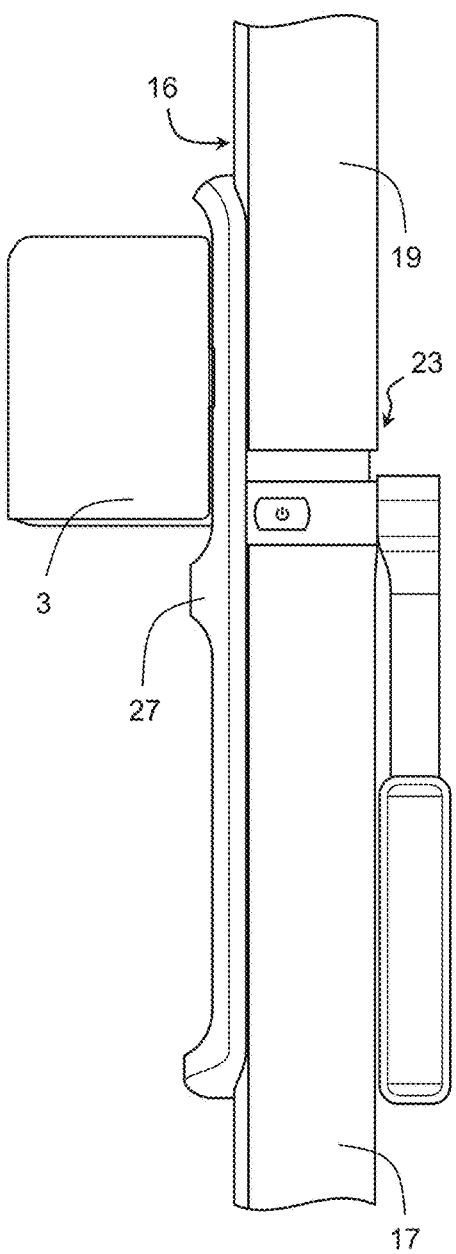

Returning to FIGS. 5-9, the vertical beam 15 may have formed thereon a vertical track 16 and may include a carrier or cart 27 slidably attached to the vertical track 16. The projector 3 may be mounted or attached to the cart 27. The cart 27 may, thus, slide vertically along the vertical track 16 to adjust the height of the projector 3 above the horizontal surface 5 and, thus, the fabric to be cut. As best shown in FIG. 6, the cart 27 may include a cart locking mechanism including a release button 28, operable between a locked mode in which the cart locking mechanism resists vertical sliding of the cart 27 along the vertical track 16 and a sliding mode in which the cart locking mechanism does not resist vertical sliding of the cart 27 along the vertical track 16. In some embodiments, the cart has a friction fit with the vertical beam in which the friction resists vertical sliding of the cart along the vertical beam.

Therefore, the height of the projector 3 is easily adjustable.

Figure 40:
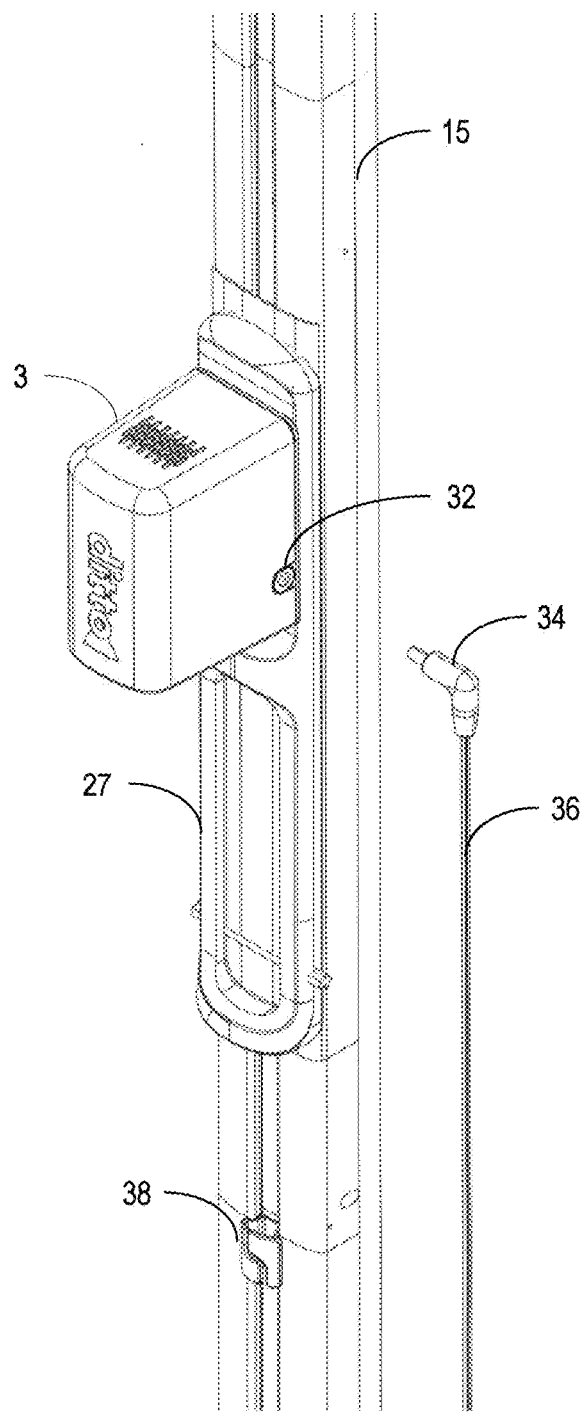
FIG. 40 illustrates a perspective view of another example of a projection system according to another aspect of the invention.

The projector 3 includes a socket 32 for receiving electrical power. Referring to FIG. 40, in some embodiments, the socket 32 is configured so that it receives a jack 34 from a power cord 36 while the projector is mounted on the cart. In the illustrated example, projector 3 has a socket 32 on the side of the projector for receiving a jack 36. In some embodiments, the vertical beam 15 includes features for power cord management.

Figure 11:
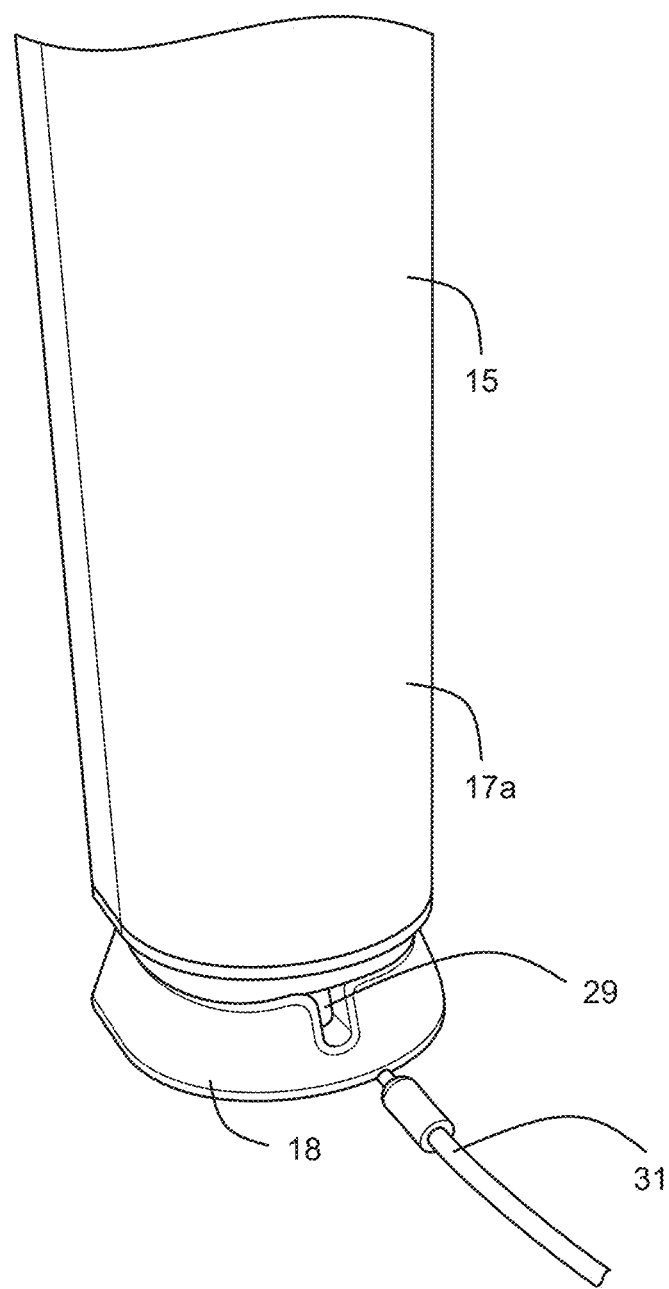
FIG. 11 illustrates a magnified perspective view of the vertical beam of FIG. 5.

In some embodiments, the vertical beam 15 is powered. In the example shown in FIG. 11, the vertical beam includes a power port 29 adjacent the bottom end 17a (e.g., in an opening of the floor engaging portion 18) to receive electrical power from a cable 31. In other embodiments the power port 29 may be disposed adjacent the top end 19a. The vertical beam 15 may have disposed therein electrical cabling forming part of an electrical power path to deliver electrical power to, for example, the projector 3. The electrical power path may include an electrical connector (not shown) that transfers electrical power to the cart 27 or to the projector 3 while allowing vertical sliding of the cart 27 along the vertical track 16.

The vertical beam 15 or the cart 27 may accept powered devices in addition to the projector 3. For example, the vertical beam 15 may accept and power lights, speakers, a laser level, a web camera, etc. The electrical power path built within the vertical beam 15 may be used to power or control these powered devices.

In some embodiments, low voltage DC power is provided to the power port 29 and distributed within the vertical beam 15 by the power path. For example, household line power may be stepped down to 5-20 volts and rectified into DC power by an external power converter as is known in the art.

As best shown in FIGS. 10A and 10B, the vertical beam 15 may also include a power switch/light indicator 33 that may be operated to interrupt electrical power flow to the projector 3 (or any other power device installed) and indicates electrical power is on when lighted. In some embodiments, the switch/light indicator 33 is mounted on the lower beam portion 17. In some embodiments, the power port 29 is connected to the switch/light indicator 33 by an electrical cord, where at least a portion of the electrical cord is coiled. The coiled portion allows movement of the telescoping portion 17b relative to the lower beam portion 17 without straining the electrical cord during extension of the telescoping portion 17b and without tangling the electrical cord upon retraction.

FIGS. 31-34 illustrate details of one example of an electrical power path including electrical connection between the lower beam portion 17 and the upper beam portion 19. Upper beam portion 19 includes elongated contact blades 82. Lower beam portion 17 includes a blade receptacle 84. The elongated contact blades 82 and blade receptacle 84 are dimensioned such that, when the lever 25 is rotated from the unlocked position to the locked position and back, the elongated contact blades 82 remain in electrical contact with blade receptacle 84 through the entire travel of the upper beam portion 19 caused by the camming mechanism. The elongated contact blades 82 are connected to electrically conductive rails within track 16 on the upper beam portion 19.

In some embodiments, the upper beam portion 19 and lower beam portion 17 include electrically conductive rails 68 (FIG. 34) within the vertical track 16. The electrically conductive rails 68 may be on opposite sides of the vertical track 16. The switch/light indicator 33 is electronically coupled to the electrically conductive rails 68. In such embodiments, the cart 27 includes contacts to make electrical contact with the electrically conductive rails 68 to receive power from the rails and transfer the power to the projector 3. In this example, the jack for receiving power on the projector 3 faces the cart 27 and engages a corresponding plug on the cart 27. In examples where the projector 3 rotates on the cart 27, the jack may comprise a barrel jack at the center of rotation of the projector.

Figure 12A:
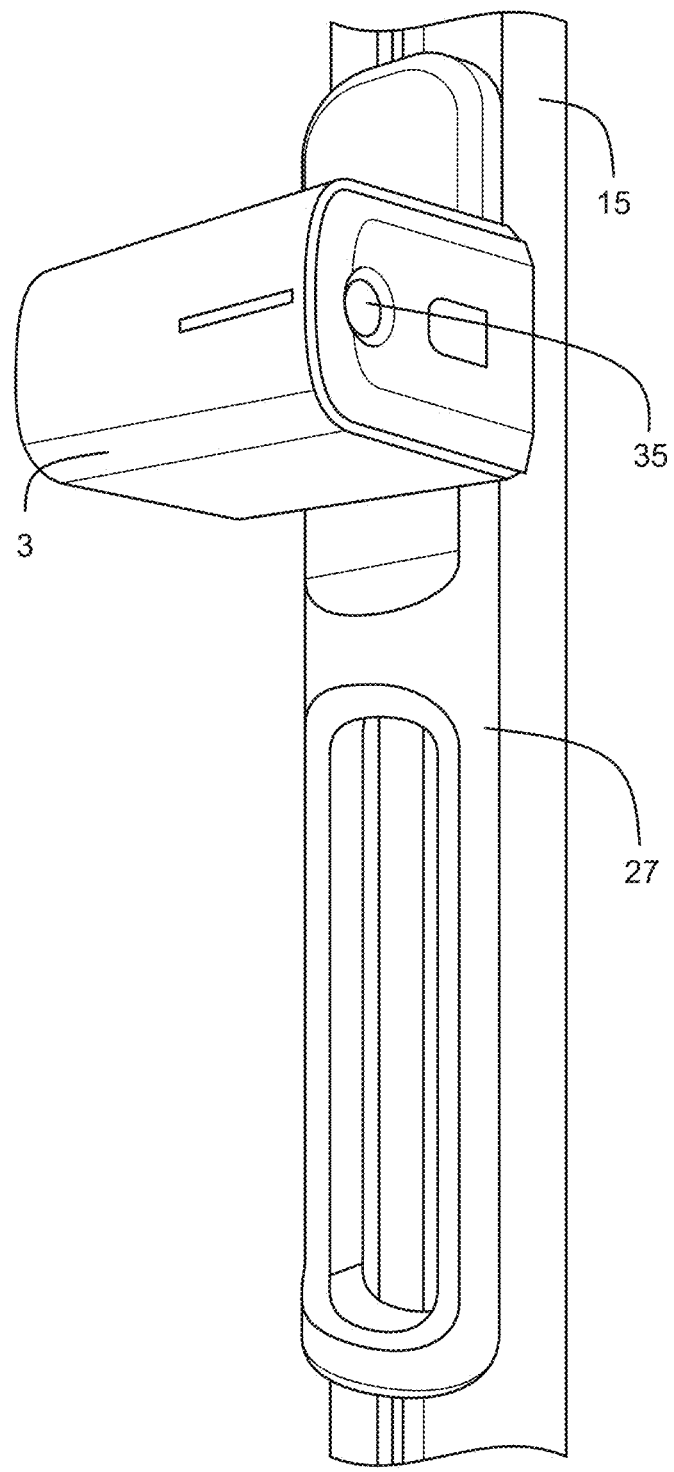
FIG. 12A illustrates a magnified perspective view of the vertical beam of FIG. 5 with a projector rotated.
Figures 12B, 12C:
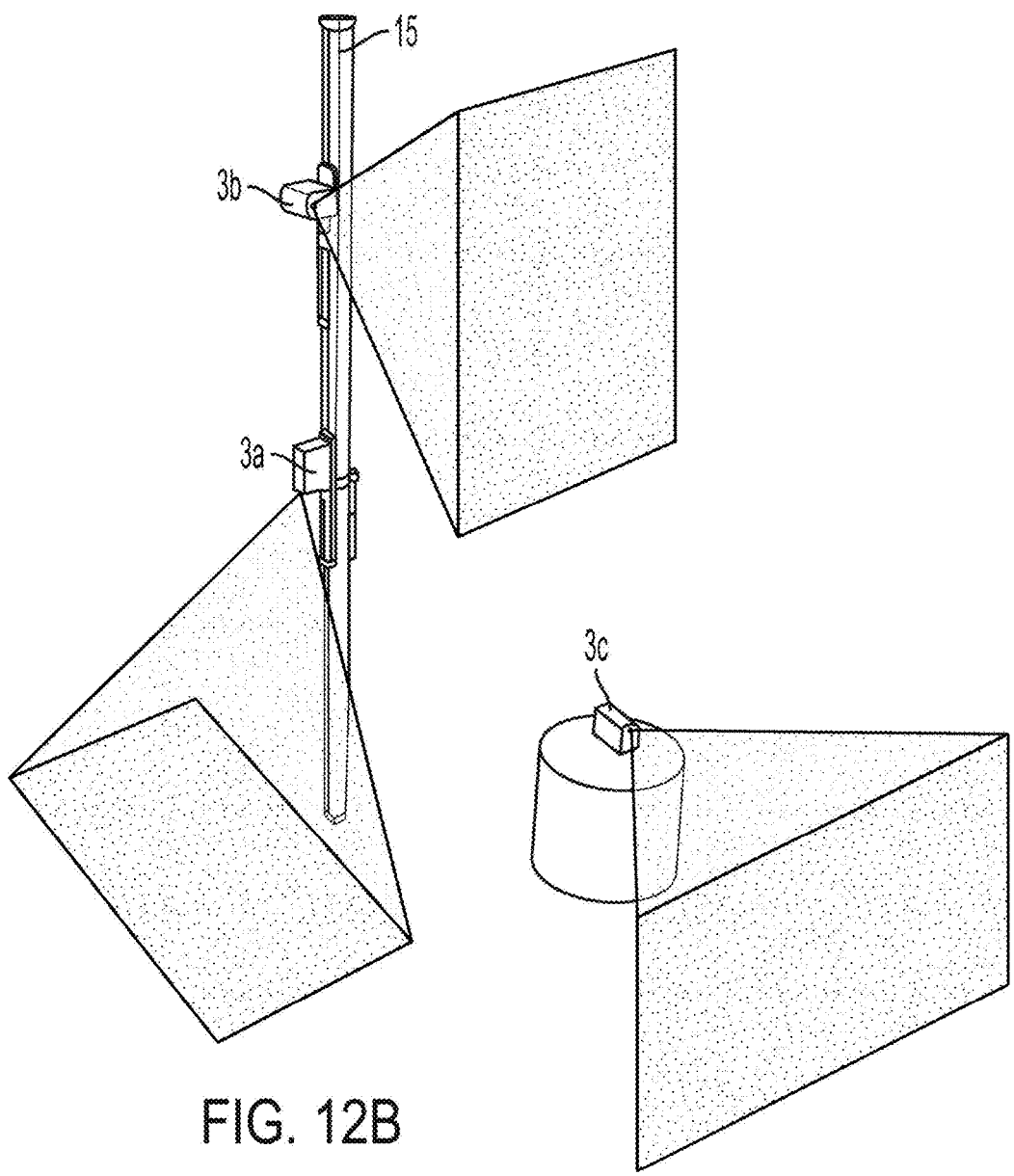
FIG. 12B illustrates an exemplary beam with projectors projecting onto a floor and wall.
FIG. 12C illustrates an exemplary projector removed from the beam and projecting while resting on a table.

As shown in FIG. 12A, the projector 3 may be rotatably attached to the cart 27 or the vertical beam 15 such that the projector 3 is rotatable 90° from the vertical orientation of FIG. 6 in which the optical lens 35 of the projector 3 is aimed down towards the floor to the horizontal orientation of FIG. 12A in which the optical lens 35 is aimed such that the axis of projection is perpendicular to the length of the vertical beam 15. This way, the projector 3 may be used to project onto a wall or other vertical surface or any surface at an angle between the floor and the wall. FIG. 12B illustrates an exemplary vertical beam 15 with a first projector 3a rotated so as to project onto the floor and a second projector 3b rotated so as to project onto the wall.

The projector 3 may be connected and disconnected from the vertical beam 15 by rotating. Rotating the projector 3 such that the projector 3 is 180° from the vertical orientation of FIG. 6 in which the optical lens 35 of the projector 3 is aimed down towards the floor to the opposite vertical orientation in which the optical lens 35 is aimed towards the ceiling may disconnect the projector 3 from the vertical beam 15. The projector 3 may then be placed on, for example, a table and used independently of the vertical beam 15. FIG. 12C illustrates an exemplary projector 3c removed from the vertical beam 15 and projecting while resting on a table.

In one embodiment (not shown), the projector 3 may be rotatable 180° from the vertical orientation of FIG. 6 in which the optical lens 35 of the projector 3 is aimed down towards the floor to the opposite vertical orientation in which the optical lens 35 is aimed towards the ceiling. This way, the projector 3 may be used to project onto the ceiling or any surface at an angle between the floor and the ceiling.

Figure 13:
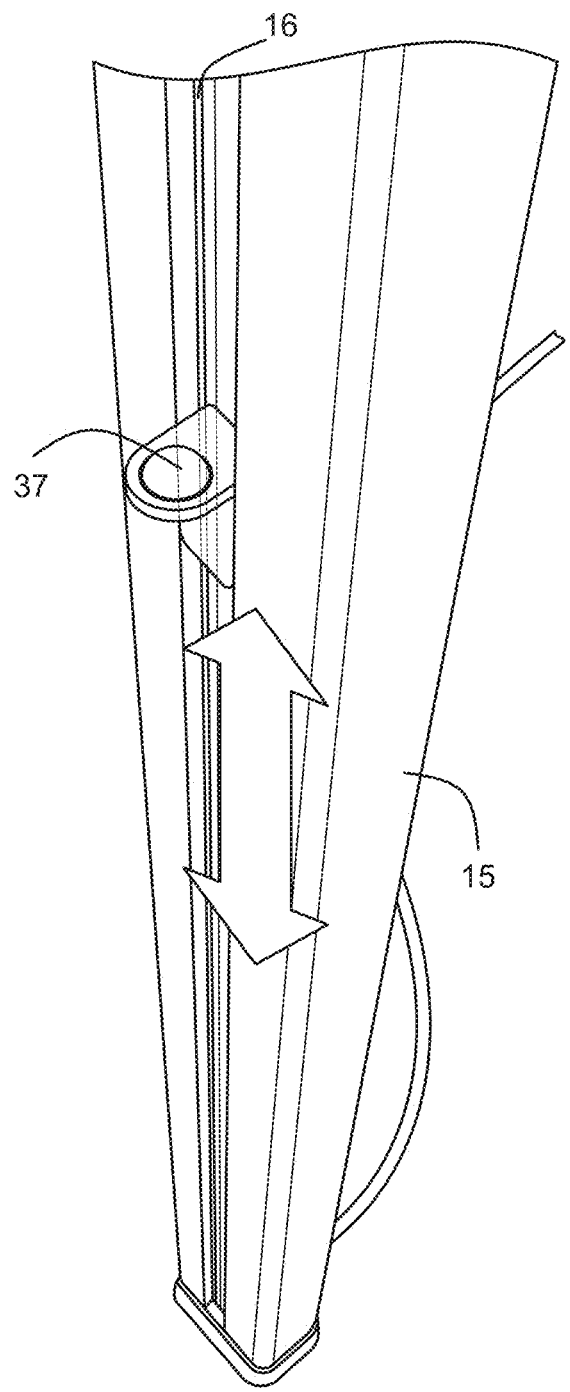
FIG. 13 illustrates a spirit level slidably attached to the vertical beam of FIG. 5.
Figure 14A:
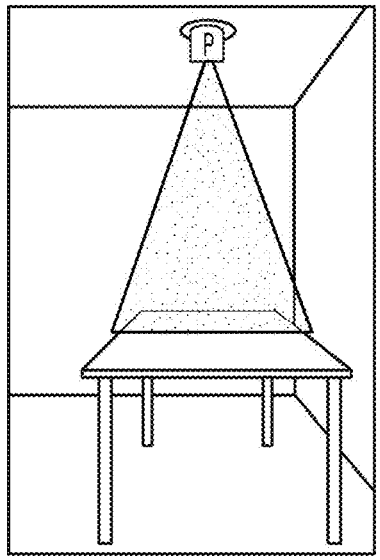
FIGS. 14A-14F illustrate alternative embodiments for installation of a projector.
Figure 14B:
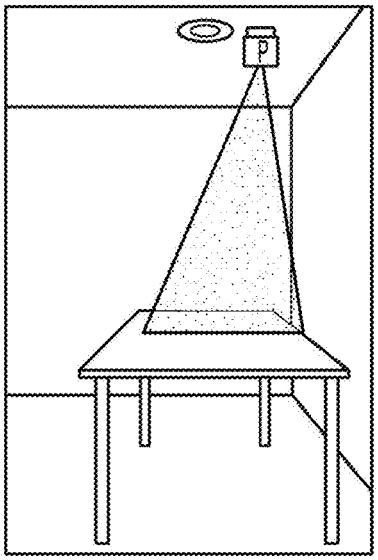
Figure 14C:
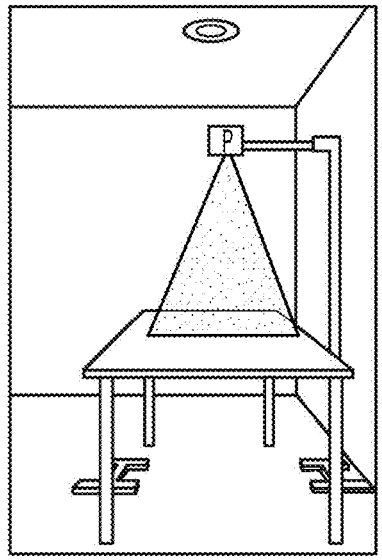
Figure 14D:
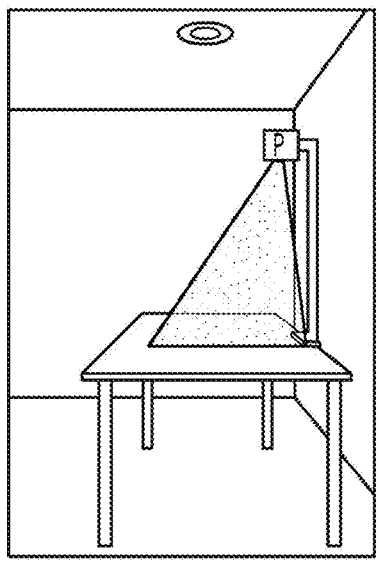
Figure 14E:
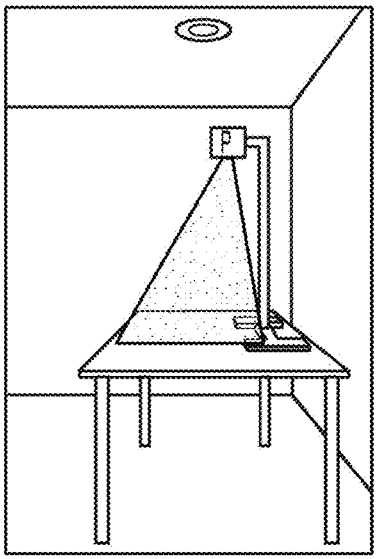
Figure 14F:
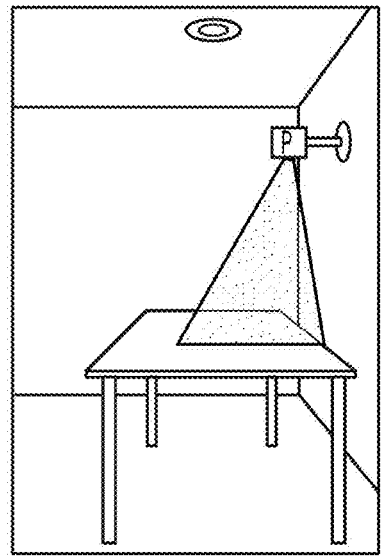

As shown in FIG. 13, the vertical beam 15 may include a spirit level 37 slidably attached to the vertical track 16 to slide vertically. The spirit level 37 may be used to indicate whether the vertical beam 15 is plumb (i.e., truly vertical).

Returning to FIG. 1, as described above, the height of the projector 3 is adjustable along the length of the vertical beam 15. Horizontally, the projector 3 may be disposed adjacent the working surface 5. The projector 3 may have an offset lens to allow for the projector 3 to reside off-to-the-side of the surface 5 rather than directly over the top of the surface 5. The projector 3 may project lines of the sewing pattern onto the surface 5. In one embodiment, the projector 3 projects these lines as white light.

In the embodiments above, the system 1 is disclosed as including the vertical beam 15 to which the projector 3 is mounted. However, this is only one example of overhead installation of the projector 3 above the surface 5. FIGS. 14A-14F illustrate additional potential installation embodiments for the projector 3 including a ceiling fixture, a ceiling mount coupled to a ceiling above the horizontal surface, a floor stand disposed adjacent the horizontal surface, a table clamp clamped to a table including the horizontal surface, a table top stand disposed on the horizontal surface, and a wall mount coupled to a wall adjacent the horizontal surface, respectively.

Moreover, in the embodiments above, the vertical beam 15 is disclosed as having inline sections and including a lever coupled to a camming mechanism. However, this is only one example of potential vertical beam configurations. Other potential configurations include beam sections that are not inline but side-to-side, three or more beam sections, telescoping sections, spring-loaded tensioning, etc. Also, in the embodiments above, the beam 15 is disclosed as anchorable between floor and ceiling.

Figure 15:
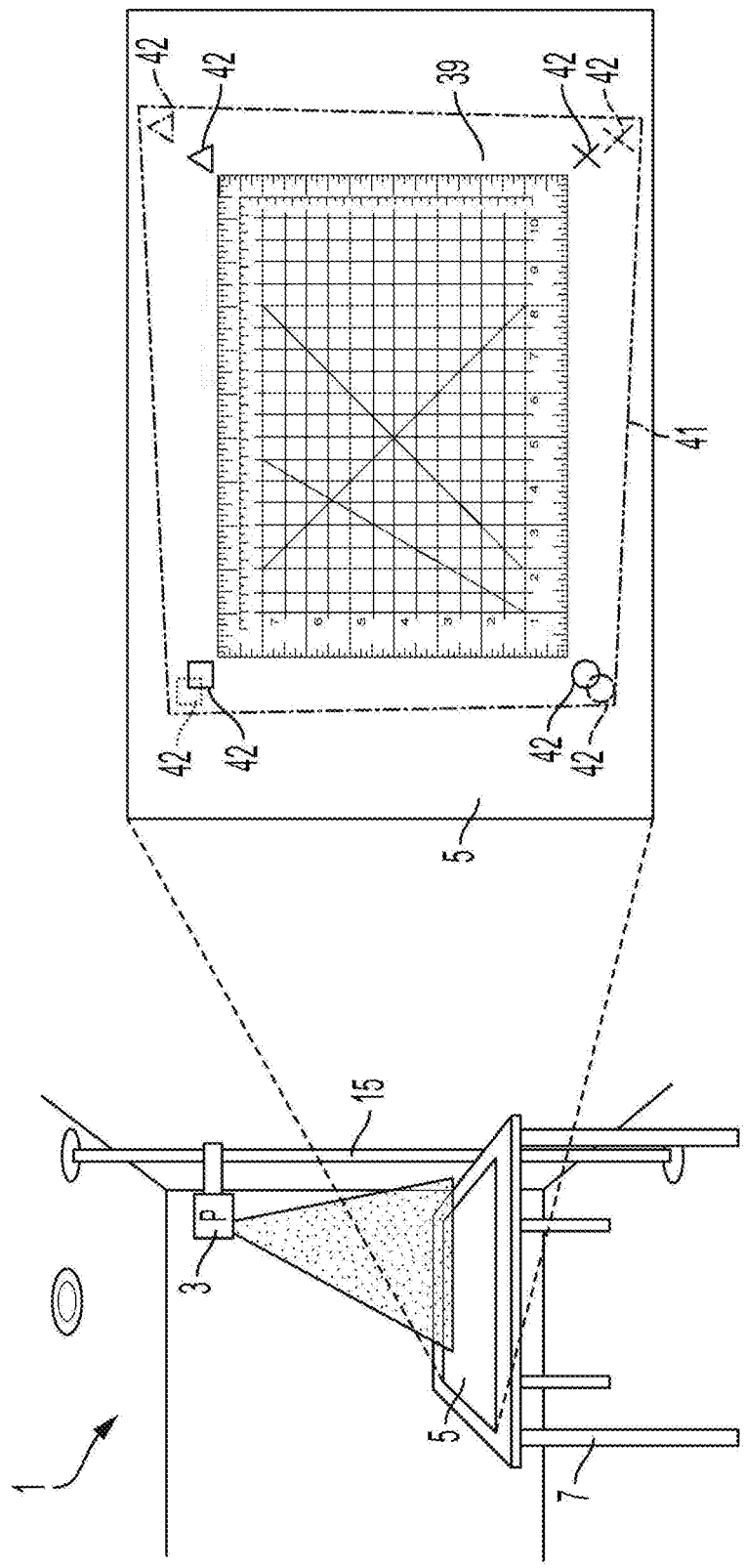
FIG. 15 illustrates the system of FIG. 1 exhibiting a problem of lack of calibration of the projection device.

Potential problems with the system 1 are misalignment, scaling, and positioning of the pattern as projected onto the fabric. FIG. 15 illustrates these problems. In the illustrated embodiment, the system 1 includes a physical calibration guide 39 that has been placed on the horizontal surface 5. The calibration guide may comprise a cutting mat with lines or other graphical features as illustrated in FIGS. 15-17 and 36. The computing device 9 transfers a calibration pattern 41 to the projector 3. The projector 3 projects the calibration pattern 41 that, if the system 1 was properly calibrated, would match at least certain aspects of the calibration guide 39. But notice that in FIG. 15 the projected calibration pattern 41 is larger and skewed in reference to the calibration guide 39 based on distortion from the projector 3.

Figure 16:
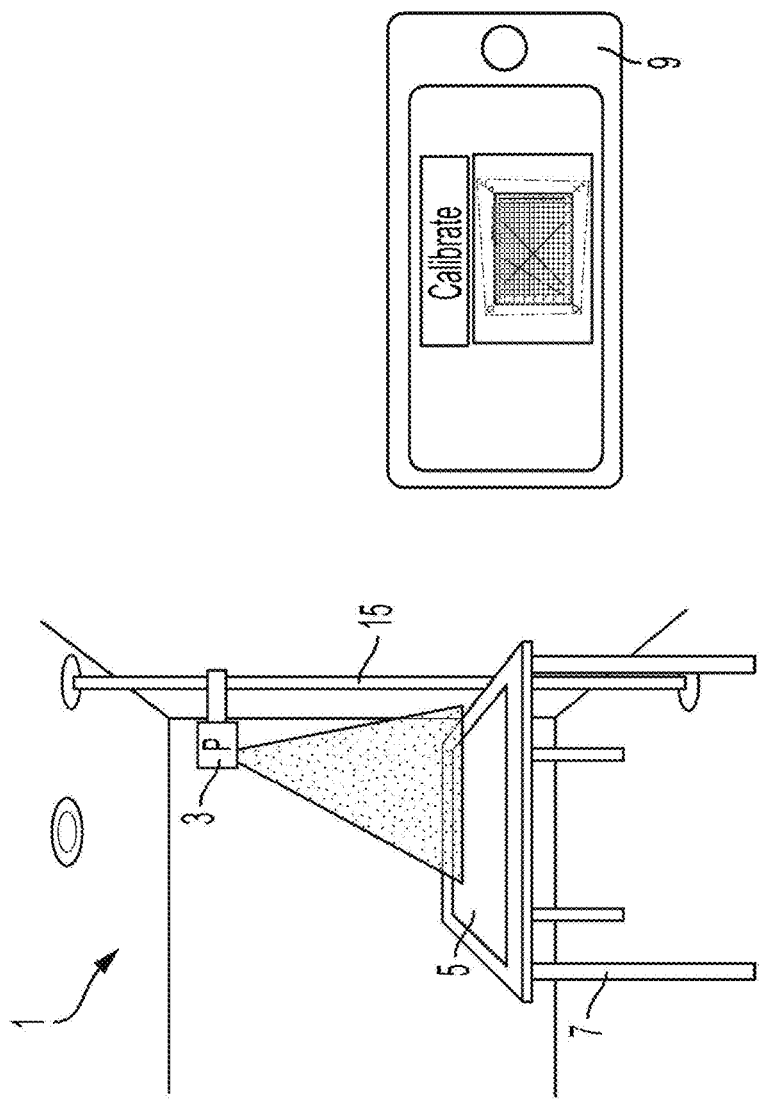
FIG. 16 illustrates schematic diagram of an exemplary calibration routine.

FIG. 16 illustrates a calibration routine in which a camera may be used to capture an image of the calibration pattern 41 as projected over the calibration guide 39. In one embodiment, the camera used is a camera of the computing device 9. In another embodiment, the camera is part of the projector 3. In another embodiment, the camera is a webcam or other dedicated camera mounted on the vertical track 16. The sewist would raise the projector 3 to an appropriate height over the horizontal surface 5. The appropriate height is selected to have the projection of the pattern at the desired scale, or at least sufficiently close to be corrected by the calibration process.

Figure 20:
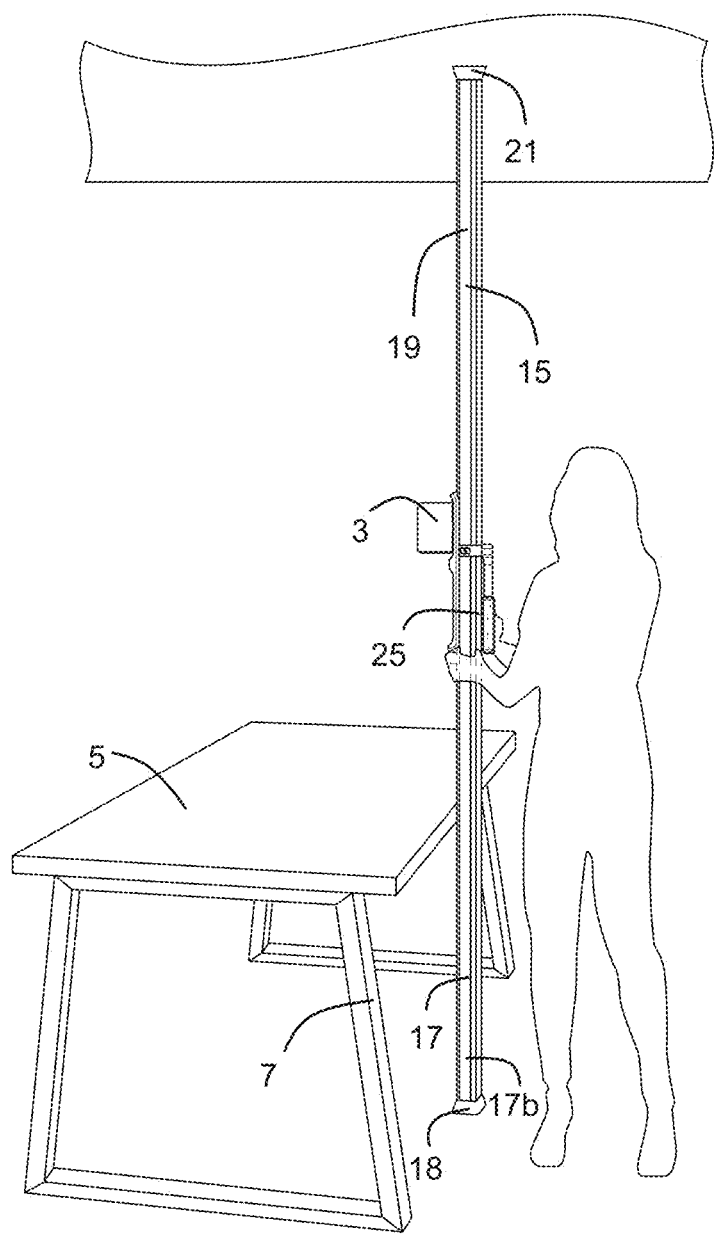

Exemplary methods of setting the projector 3 to an appropriate height may be better appreciated with reference to FIGS. 18-20. As illustrated in FIG. 18, a user may first position the vertical beam 15 (beam locking mechanism 23 locking the upper beam portion 19 to the lower beam portion 17) slightly off the surface 5 (off table 7) onto which the pattern is to be projected. In the example of FIG. 18, the telescoping position 17b is spring biased. The lower telescoping portion 17b is positioned such that the vertical beam is slightly longer than the distance between the floor and ceiling. To determine an appropriate length, a user may place the floor-engaging portion 18 a short distance from a wall (six to ten inches, for example), extend the vertical beam 15 to reach the ceiling where the wall meets the ceiling, and then fasten the locking means for the telescoping portion. The user then compresses the telescoping portion of the beam and spring, positions the beam, and releases the beam such that the beam extends vertically, engaging the ceiling and floor. In this example, the upper beam portion 19 and lower beam portion 17 remain in a fixed relationship with each other, as the spring-biased telescoping portion performs the biasing function.

In another example, as illustrated in FIG. 19, the user may then operate the lever 25 to unlock the beam 15. Unlocking releases the telescoping portion 17b so that it may telescope generally downwardly from the lower beam portion 17. It also unlocks the upper beam portion 19 from the lower beam portion 17 to extend the vertical beam 15 approximately to the ceiling height. The user may then further extend the vertical beam 15 by operation of the lever 25 such that the floor engaging portion 18 engages the floor and the ceiling engaging portion 21 engages the ceiling.

As illustrated in FIG. 20, the user may first use the spirit level 37 to verify the vertical beam 15 is plumb and then operate the lever 25 to the locked position for anchoring the vertical beam 15 to the floor and ceiling.

Figure 21:
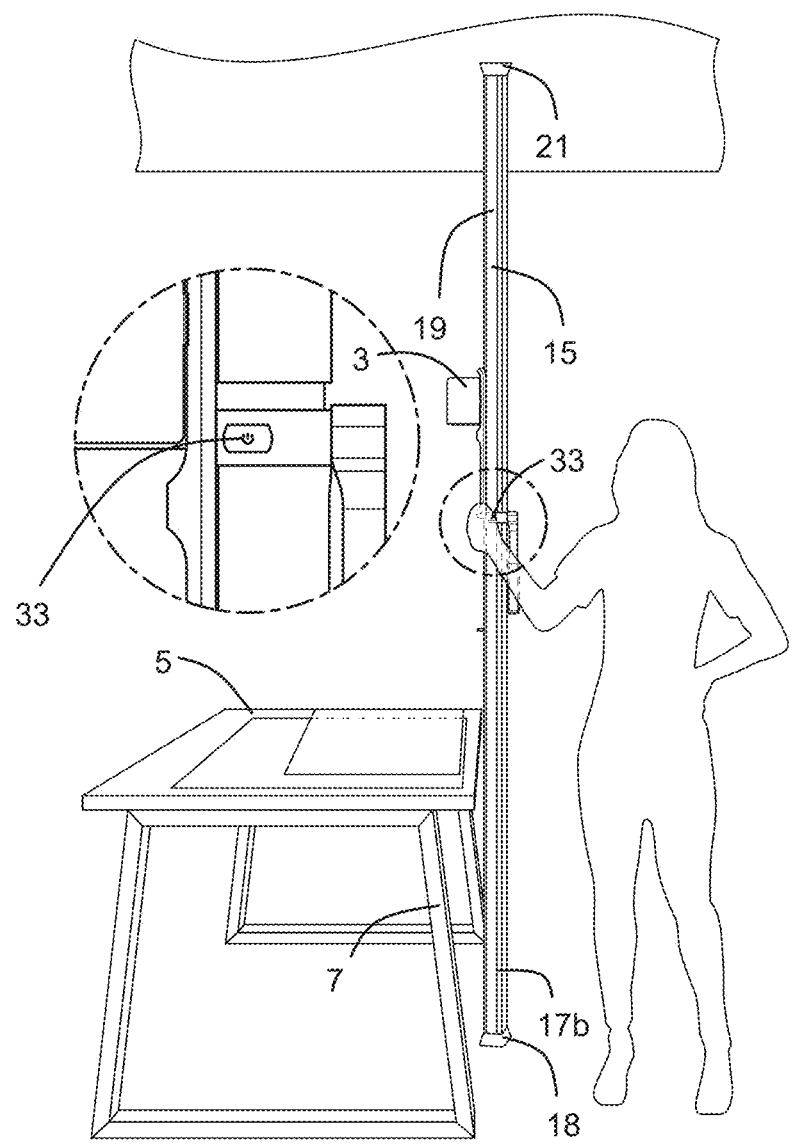
Figure 22:
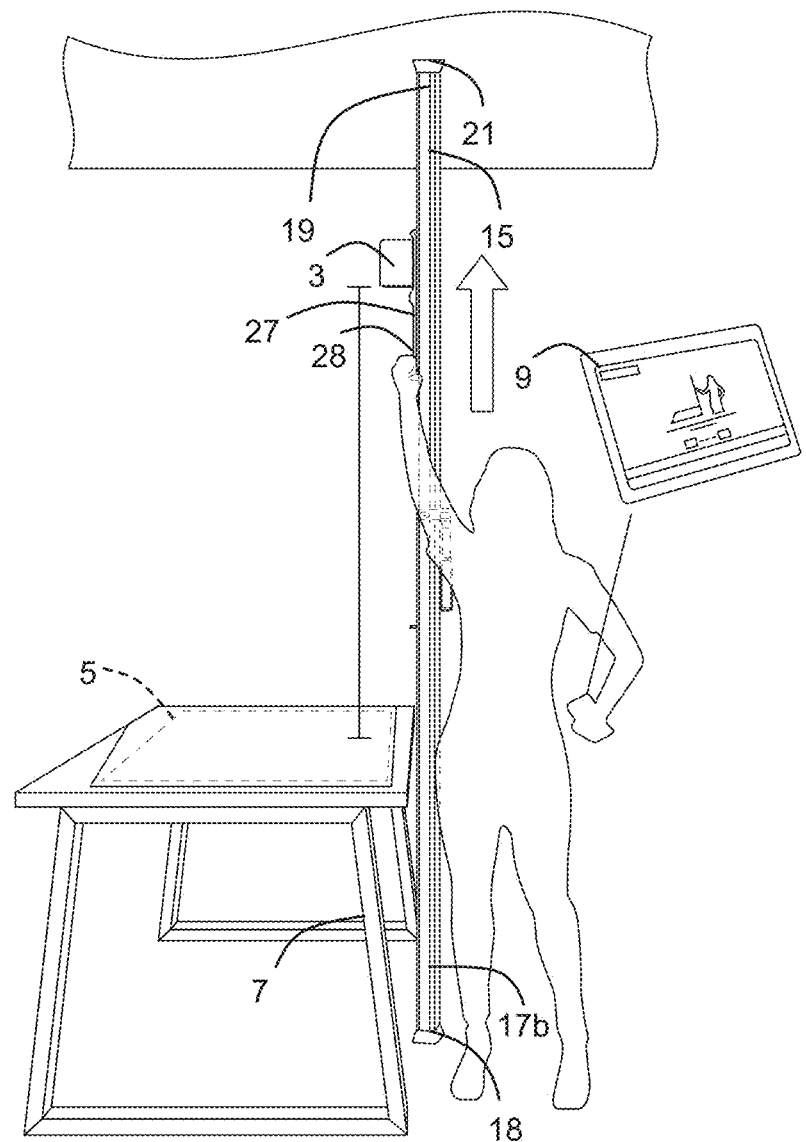

As illustrated in FIG. 21, the user may then operate the switch 33 to apply electrical power to the projector 3. Data connections between the computing device 9 and the projector 3 are made as described above. The computing device 9 transfers an image of the calibration pattern 41 to the projector 3, which causes it to project the image of the calibration pattern 41. As illustrated in FIG. 22, the user may then depress the release button 28 to release the cart 27 and raise the projector 3 above the surface 5 such that the calibration pattern 41 aligns as close as possible with the calibration guide 39 resting on the surface 5. The user may then release the button 28 to lock the cart 27 in position along with the projector 3.

In one example, the calibration pattern 41 comprises two patterns. A first projected calibration pattern comprises a positioning pattern to assist in setting the projector at an appropriate height. The positioning pattern may comprise, for example, a simple rectangle. The user may slide the projector up and down until the projected rectangle is close to a rectangle at or near a periphery of the physical calibration guide 39. In some embodiments, the user is instructed by the computing device 9 to adjust the height of the projector until the rectangle of the positioning pattern just exceeds the size of the rectangle of the physical calibration guide 39. Advantageously, this ensures that corrections applied after calibration will not exceed the field of projection for the projector.

At this point, the user may indicate to the computing device 9 that the user is ready for the next step in the calibration routine. The computing device 9 then transfers a second image of a calibration pattern 41 to the projector with additional features to aid in calibration.

In some embodiments, a photograph is taken of the calibration pattern 41 as projected over the calibration guide 39. The picture may be taken with the camera of the computing device 9 directly or with the camera in the projector 3 using an application or logic in the computing device 9 that has access to the camera. In some embodiments, visual guidance is rendered on a display of the camera/computing device 9 to assist a user in properly framing the calibration pattern 41 and calibration guide 39.

Based on the difference in position, scale, and skew between features of the calibration pattern 41 in the image in reference to features in the calibration guide 39 in the image, a calibration logic and/or processor in the computing device 9 may calculate necessary adjustments in scale, skew, keystoning effect, position, and other distortions of the calibration pattern 41 (and, thus, necessary adjustments to projections from the projector 3) for the calibration pattern 41 to align with the calibration guide 39. In one example, each of the calibration pattern 41 and the calibration guide 39 include unique fiducials 42 at corners to uniquely identify each corner.

Figure 35:
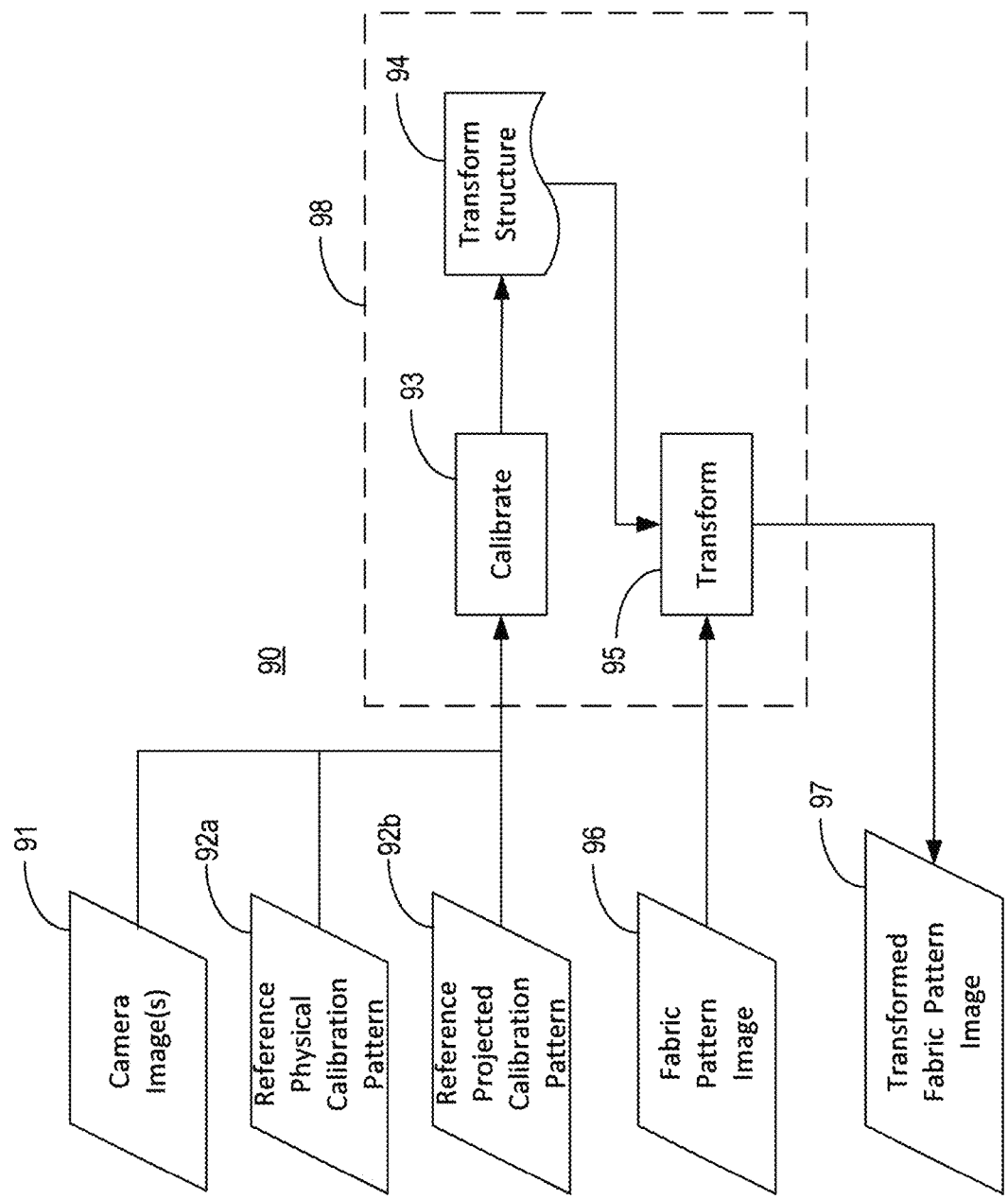
FIG. 35 illustrates a projector calibration flow path.
Figure 36:
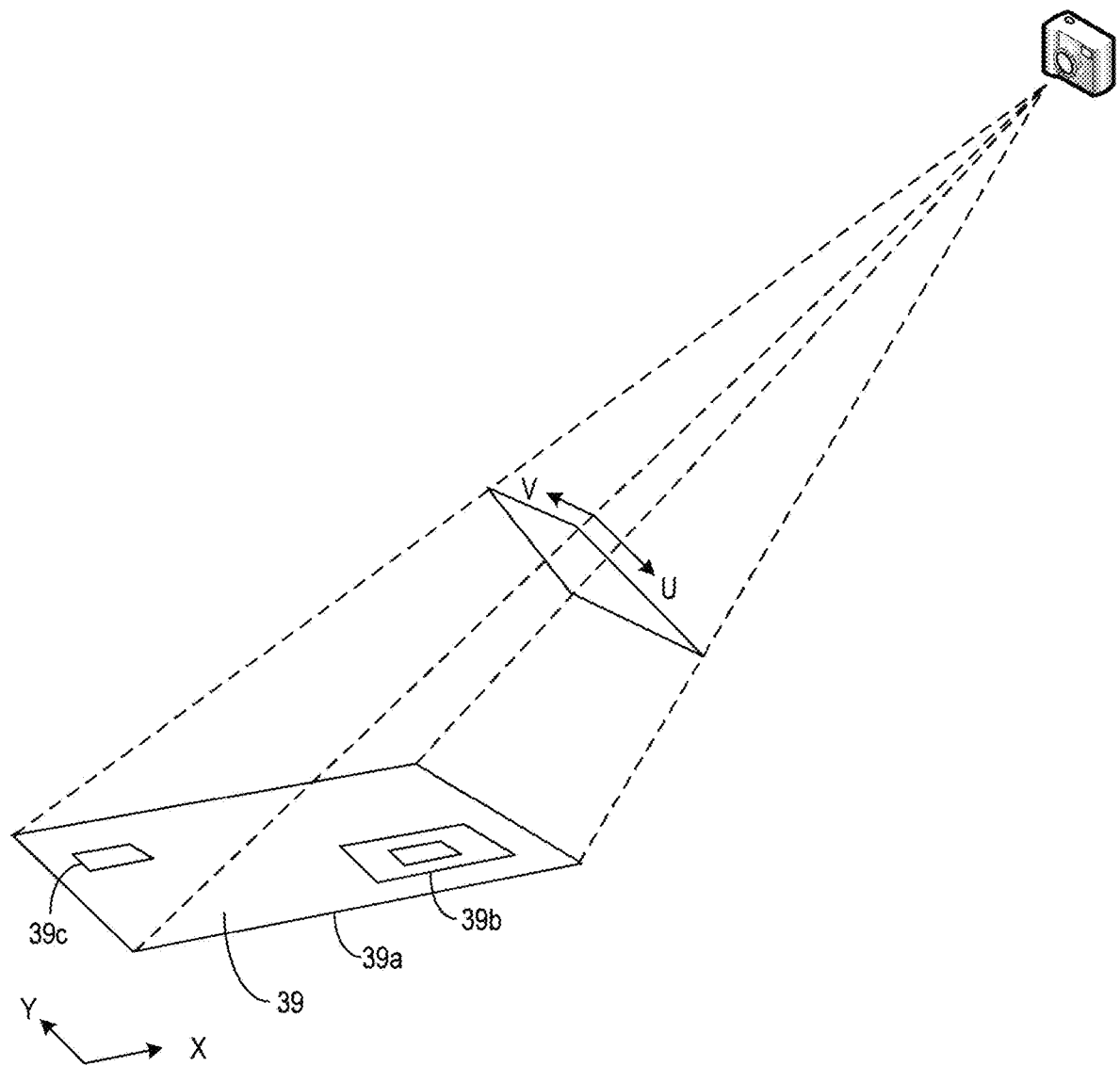
FIG. 36 illustrates projection of a calibration pattern onto a camera plane.
Figure 37:
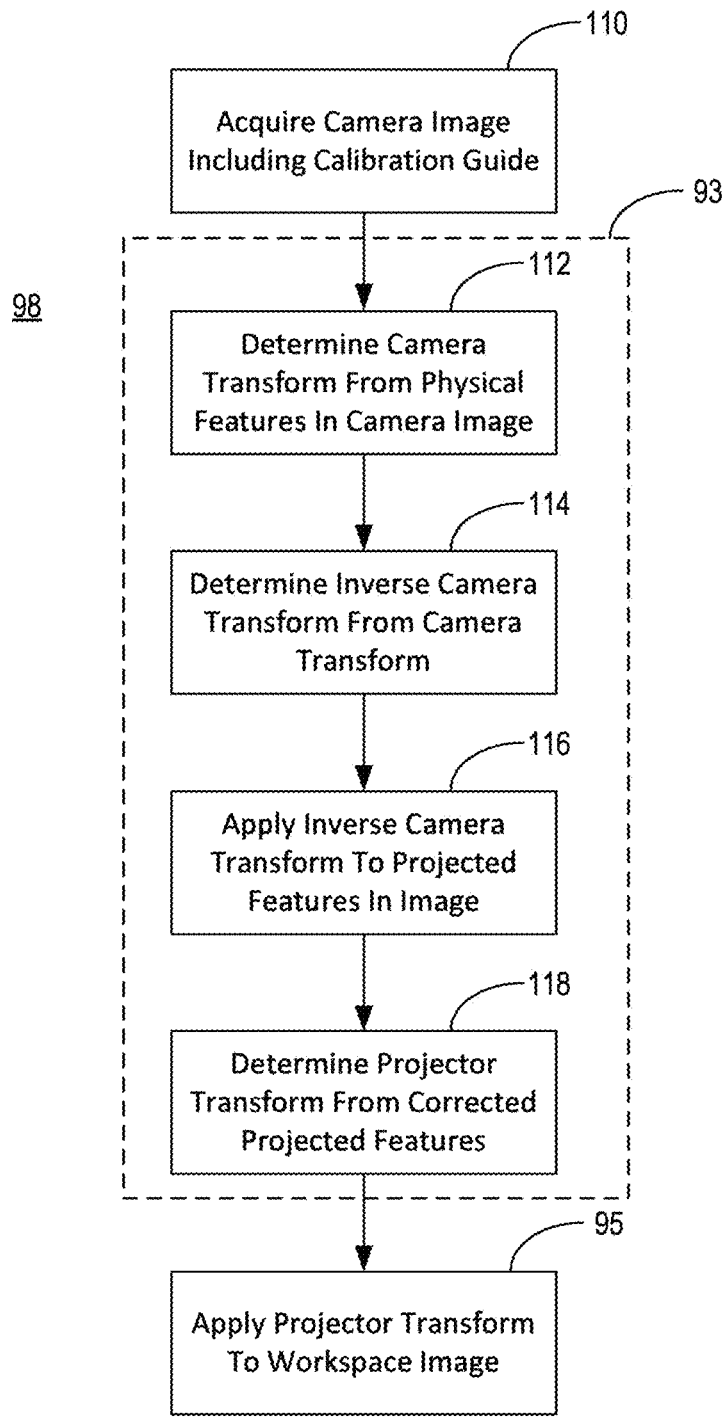
FIG. 37 is a flow chart for generating a projector transform.

One example of a calibration data flow 90 is illustrated in FIG. 35. The calibrate process 93 receives one or more projection/calibration guide images 91, which may be captured with a camera by any of the means/methods described above. The calibrate process 93 also receives a reference calibration guide pattern 92a and a reference calibration pattern 92b corresponding to the physical calibration guide 39 and to the projected calibration pattern 41 respectively. The calibrate process generates and stores a transform structure 94, for example, in memory. During projection of a pattern, such as a sewing pattern, transform process 95 accesses the transform structure 94 and a fabric pattern image 96 to be projected. Transform process 95 applies the transform structure 94 to the fabric pattern image 96 to generate a transformed fabric pattern image 97, which is then provided to the projector 3. The projector 3 then projects the transformed fabric pattern image 97 onto the fabric or other material to be cut or marked. The calibrate process 93, transform structure 94 and transform process 95 may comprise a calibrate and transform library 98.

In some embodiments, the calibrate process 93 includes determining a transform for the camera point of view, including orientation, position, and scale transforms using projective geometry. For example, the calibrate process 93 may recognize the calibration guide 39 in the camera image and derive a camera transform based on one or more images of the calibration guide 39 and the reference calibration guide 92a. In some embodiments, projector transforms in the transform structure also include orientation, position, and scale transforms. For example, once the camera transform is known, an inverse of the camera transform may be applied to one or more images of the projection of the calibration pattern 41 and be used to determine the projector transform.

Referring to FIGS. 36-39, an example of deriving the camera transform and the projector transform is provided. The calibration guide 39 is provided having a large outer rectangle 39a and smaller optical patterns 39b, 39c with additional features within the outer rectangle 39a. The calibration guide 39 is placed under the projector 3 and within the field of projection of the projector 3. The calibration guide 39 defines a guide plane defined by x and y axes, and each feature point on the calibration guide 39 is associated with an x, y coordinate in the guide plane. These known x, y coordinates are represented in the reference calibration guide 92a, which may comprise a digital image of calibration guide 39.

A camera image is acquired in step 110 of the calibration guide 39 and projected calibration pattern 41. The optics and image sensor of the camera define a camera plane having axes u, v. Pixels within the camera image have an association with u, v coordinates in the camera plane. However, because the camera plane will typically be non-parallel to the guide plane during image acquisition, projection of the outer rectangle onto the camera optics results in distortion of the rectangle, such that in the camera image, it is a non-rectangular quadrilateral. Also, the coordinate axes of the camera plane will typically be rotated with respect to the guide plane. Using known techniques in projective geometry, based on the acquired u, v coordinates of feature points and known x, y coordinates of corresponding feature points in the reference calibration guide 92a, a scaling factor and orientation of the camera image relative to the calibration pattern 41 may be determined. This is the camera transform.

Figure 38:
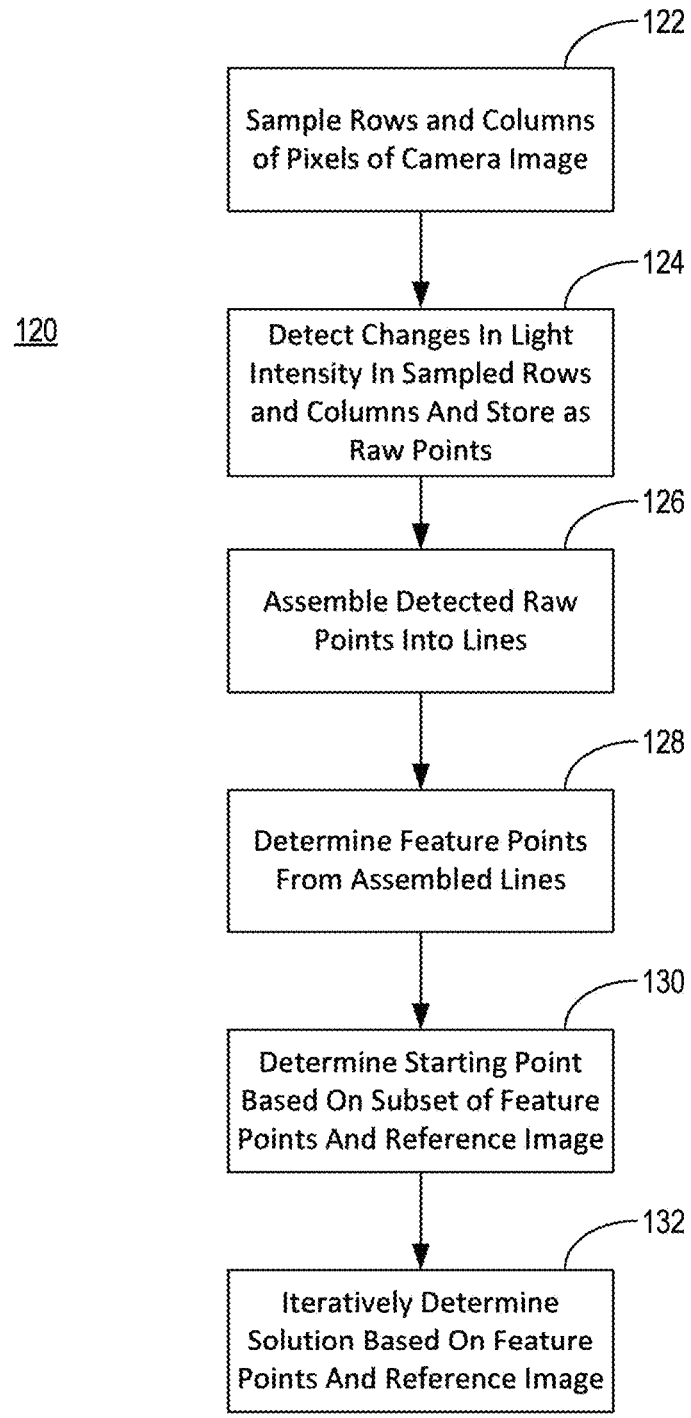
FIG. 38 is a flow chart for determining a camera transform.

Processing all of the pixels of the camera would be disadvantageous due to the processing requirements and because of the potential for misalignment of the camera inadvertently omitting certain feature points. Referring to FIG. 38, in one embodiment, a two-step, scaled approach 120 is used. A sampling of substantially fewer than all rows and columns of pixels of the camera image is made in step 122. Sample steps may depend on image sensor resolution. In some examples, for a 4032×3024 pixel image, every $20^{th}$ row and every $20^{th}$ column of pixels may be sampled. Different sampling intervals, such as every $15^{th}$ row/column, or every $30^{th}$ row/column, may be used as appropriate to image resolution and optical features to be detected. This substantially reduces the processing requirements without sacrificing accuracy. Each sampled row/column is processed to determine the presence of a line or presence of an edge of a larger optical feature on the calibration guide 39 in step 124. Pixels indicating the presence of a line or edge are stored as raw points. Line features may be identified by detecting abrupt changes in image intensity. Edges of other geometric features may be identified by detecting changes in a gradient of light intensity.

Lines segments of at least the outer rectangle of the calibration guide 39 are built from the raw points in step 126. Building the line segments relies on the fact that straight lines in the calibration pattern will also generally appear as straight lines in the camera image, even when projected onto the camera sensor plane (distortions may be detected due to camera optics). Raw points are grouped for line segment building using two criteria: (1) proximity and (2) linearity. These criteria are used quantitatively and jointly to form line groups and then add additional Raw points to the line groups. The linearity criterion utilizes linear coefficients for each evolving line group. These coefficients may be dynamically updated as new raw points are added to the group. The proximity criterion tests a candidate raw point for inclusion in the group based on the shortest distance to any member of the group. Similar to the linearity criterion, the proximity criterion may be dynamically updated as new raw points are added to the group.

Where the derived lines intersect each other defines the corners of the outer rectangle, which are stored as feature points in step 128. Because numerous raw points are used to determine lines or edges, the intersections of the lines or edges locate the feature points with a high degree of accuracy. In some embodiments, the use of such constructed line segments enables determination of feature points even if the actual feature point is inadvertently omitted from the image. For example, if sufficient portions of two lines of a feature are detected, an intersection of the two lines may be determined, even if the actual intersection of the lines is cropped out of the camera image.

The feature points identified in the camera image are then matched to the feature points in the reference calibration guide 92a. In one example, the four feature points corresponding to the four corners of the outer rectangle 39a of the calibration guide 39 in the camera image are used to determine an initial starting point for determining camera position, orientation and distance from the calibration guide 39 in step 130. The four corners may be used to determine an initial orientation of the coordinate system of the guide plane relative to the camera plane. For example, the outer rectangle 39a of the calibration guide 39 comprises two sets of mutually orthogonal parallel lines. However, when projected onto the camera plane, the physical parallel lines are no longer parallel. The location of where the lines intersect in the camera plane may be used to derive the initial starting point.

The process also determines feature points for additional printed, graphic or other optical features on the camera image of the calibration guide 39 and matches them to the reference calibration guide 92a in a similar manner. In some examples, the additional optical features comprise lined polygons, solid polygons, and/or nested solid polygons. The additional feature points for both the camera image and the reference image are input to an iterative process along with the initial starting point and solutions are iteratively obtained until the solution converges in step 132. In one example, this Forward Camera Transform is built into an iterative, non-linear least squares fitting algorithm called MPfit. MPfit uses the Levenberg-Marquardt algorithm that is built as a combination of a gradient descent method and the Gauss-Newton method.

Figure 39:
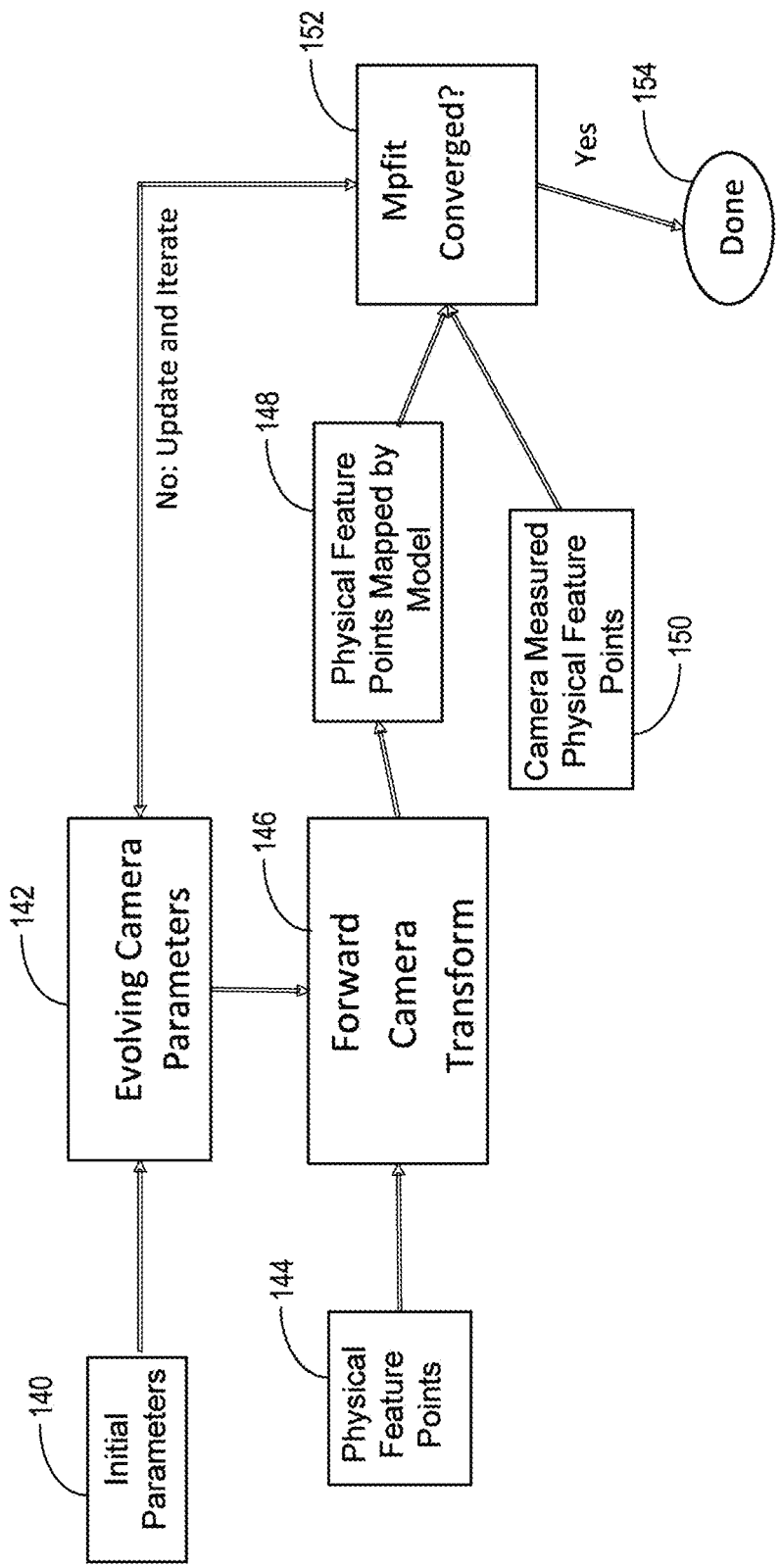
FIG. 39 is a block diagram of an algorithm for determining a camera fit model.

A block diagram for the camera model fit process is provided in FIG. 39. In this diagram, feature points from the reference calibration guide 92a are mapped by the forward camera transform model and then compared with the physical feature points of the calibration guide 39 as measured by the camera image. Initial parameters 140 are used to initialize evolving camera parameters 142. Physical feature points 144 and camera parameters 142 are input to the forward camera transform 146. Mapped physical feature points 148 are generated according to the current iteration of the forward camera transform model. Mapped physical feature points 148 and camera measured physical feature points 150 are compared to determine whether the model has converged 152. If not, the result is input back into the camera parameters 142. If the model has converged, the process is completed 154.

While the above embodiments are described with respect to polygons, other graphic features may also be used. For example, the same techniques may be applied to detect a circumference of a circle (lined or solid). Then a center of the circle may be identified from the reconstructed circumference of the circle.

Up to this point, the process has been concerned solely with the printed/graphic optical features of the physical calibration guide 39. The camera image also includes projected optical features from the projected calibration pattern 41. Physical graphic/optical features and projected optical features may be distinguished from each other because each feature is known from the references 92a, 92b. Additionally, in one example, the projector is positioned so that an outer rectangle of projected features of the calibration pattern 41 is outside physical features of the physical calibrating guide 39. This allows for the four corners of outer rectangle 39a to be determined unambiguously.

Returning to FIG. 37, in some embodiments, to determine the projector transform, the process determines the feature points of the projected features in the image as above. An inverse of the camera transform is determined in step 114. Applying the inverse camera transform to the projected image feature points in step 116 removes the skew imposed by the camera being out of plane with and off center from the plane of the projected image on the calibration guide 39.

In some embodiments, once again using projective geometry, using the location of feature points of the projected calibration pattern 41 after the inverse camera transform has been applied, a projector transform is calculated by in step 118 comparing locations of these transformed feature points to the known feature points in reference 92b. In some examples, because the positioning of the projector 3 with respect to the horizontal guide is fairly well known, the initial starting point may be assumed rather than calculated.

Once the projector transform is known, it is possible to construct an inverse projector transform and apply it to images (patterns) to be projected prior to sending the image to the projector. However, a more efficient approach is to implement the projector transform as a "pull" while in the projector coordinate system. In this example, the software process will loop through all the "output" pixels of the projector, and then get the corresponding "input" pixel for the pattern to be transformed. Because of this, the projector transform is implemented using the forward projector transform.

In some embodiments, multiple camera images are obtained, and multiple solutions obtained to more robustly fit the projector model. In one example, a camera transform is determined for each acquired camera image and projector feature points are determined for each image using each image's respective inverse camera transform. Then, the inverse projector feature points are combined and a projector transform is determined from the combined set of inverse projector feature points.

In some embodiments, the transform library is generated as above, but the workspace projected by the projector is not limited to the scale as calibrated. For example, if a table is used as the horizontal surface for calibration, the table may be removed, and the projector will project the workspace onto the floor. The same projector transform may be used without re-calibrating, with the system adjusting for the scale of projection only.

In one embodiment, the calibration logic may use the locations of the fiducials 42 (e.g., the difference in location between a fiducial on the imaged calibration guide 39 and the corresponding fiducial on the imaged calibration pattern 41) to understand the difference in position, scale, keystoning effect and skew between the imaged calibration pattern 41 in reference to the imaged calibration guide 39 and perform automatic calibration based thereon. Fiducials may refer to the markings 42 on FIGS. 16 and 17 or any other detectable pattern that reflects a lack of calibration in position, scale, or skew in the pattern as projected as compared to the pattern as intended.

Moreover, the computing device 9 or projector 3 may be equipped with an accelerometer and/or a gyroscope to account for tilt/angle when imaging for calibration. One or more iterations of the above-described calibration process may be necessary to achieve proper calibration.

Figure 17:
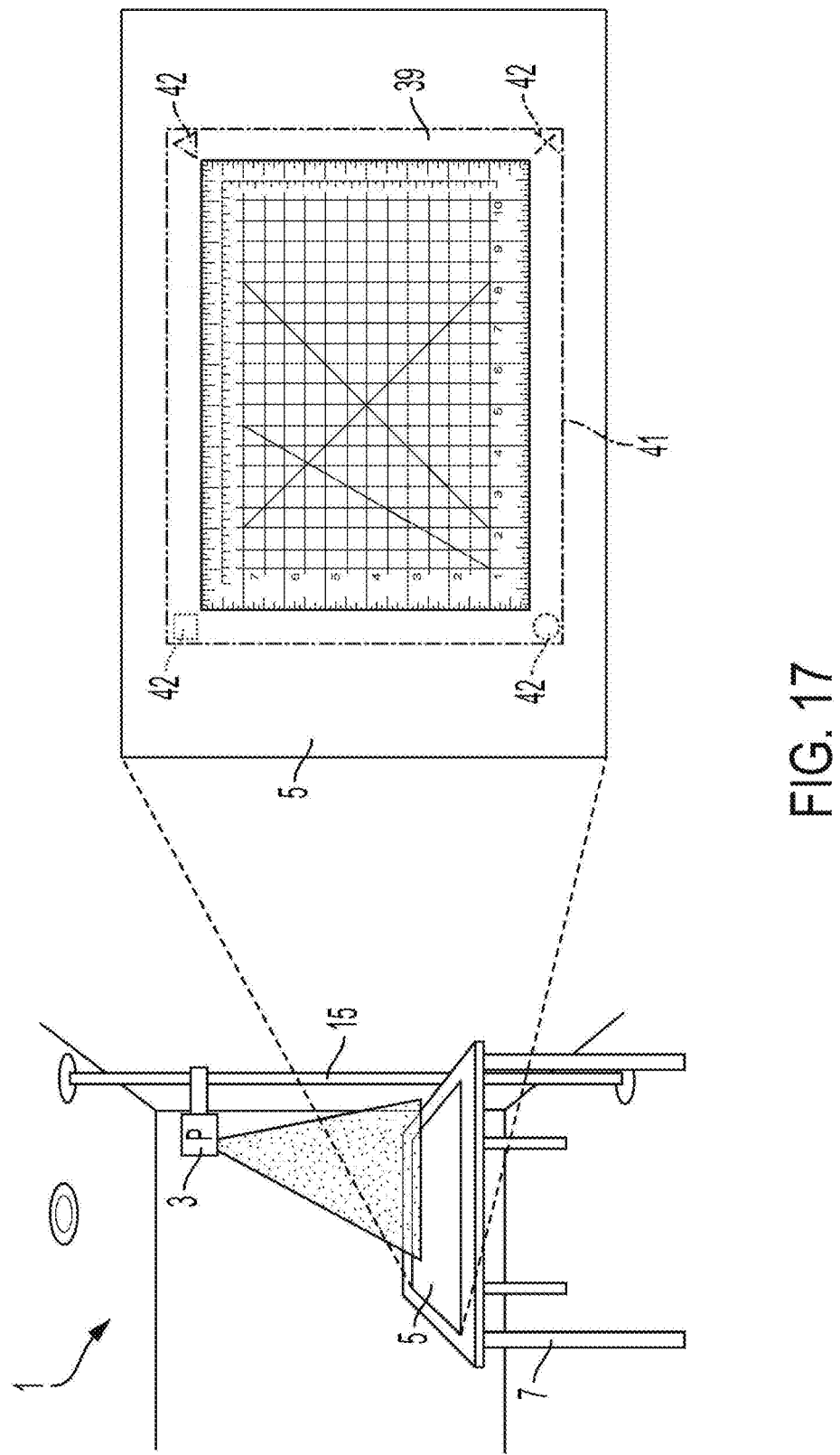
FIG. 17 illustrates the system of FIG. 1 after calibration.

FIG. 17 illustrates the system 1 after calibration. The projector 3 projects the calibration pattern 41 that, because the system 1 is now properly calibrated, matches the calibration guide 39.

After calibration, the system 1 is ready to be used for projecting patterns upon fabric to be marked or cut. The user may place the fabric on the surface 5 and choose a pattern piece to be projected onto the fabric.

Figure 23:
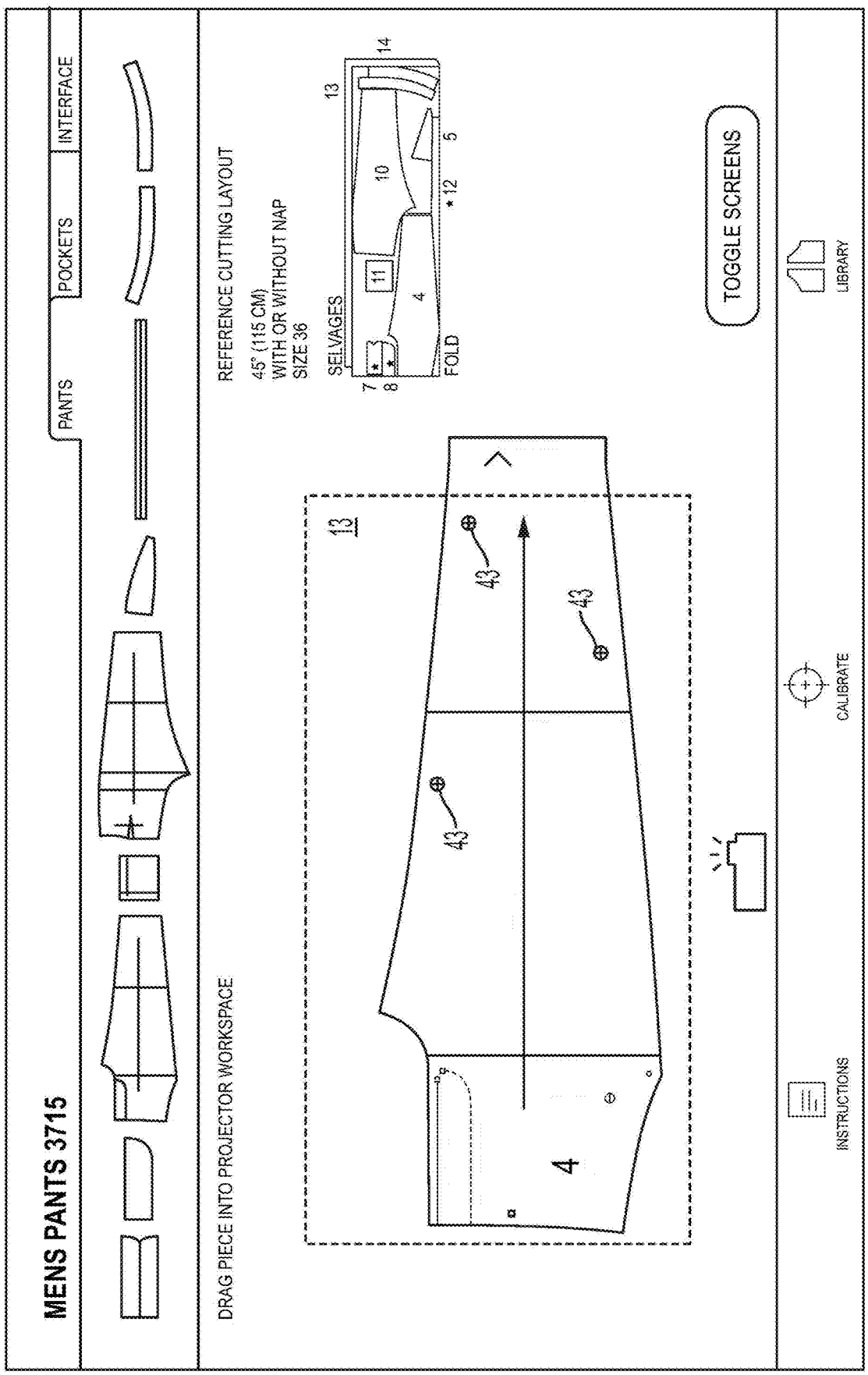
FIG. 23 illustrates an exemplary problem of too long a pattern piece to project at once.

Another potential problem with the system 1 is what to do when a pattern piece is too large (e.g., too long) to be completely projected at once on the surface 5. FIG. 23 illustrates the problem. Notice that the pant leg 4 is too long to fit within the projection frame, the workspace 13 representing the horizontal surface 5. The sewist will not be able to project the pattern for the pant leg 4 at once. Instead, the sewist will need to perform splicing.

Splicing is the process of dividing a pattern piece into several sections or portions. Fiducials 43 are algorithmically placed within the outline of any pattern piece that extends beyond the projector workspace 13 and projected together with the pattern piece outline. The sewist marks the locations of the fiducials 43 on the fabric with stickers, chalk, etc. Once the first pattern portion within the projector workspace 13 is either traced or cut and the fiducials are marked, the projector workspace 13 can be advanced.

Figure 24:
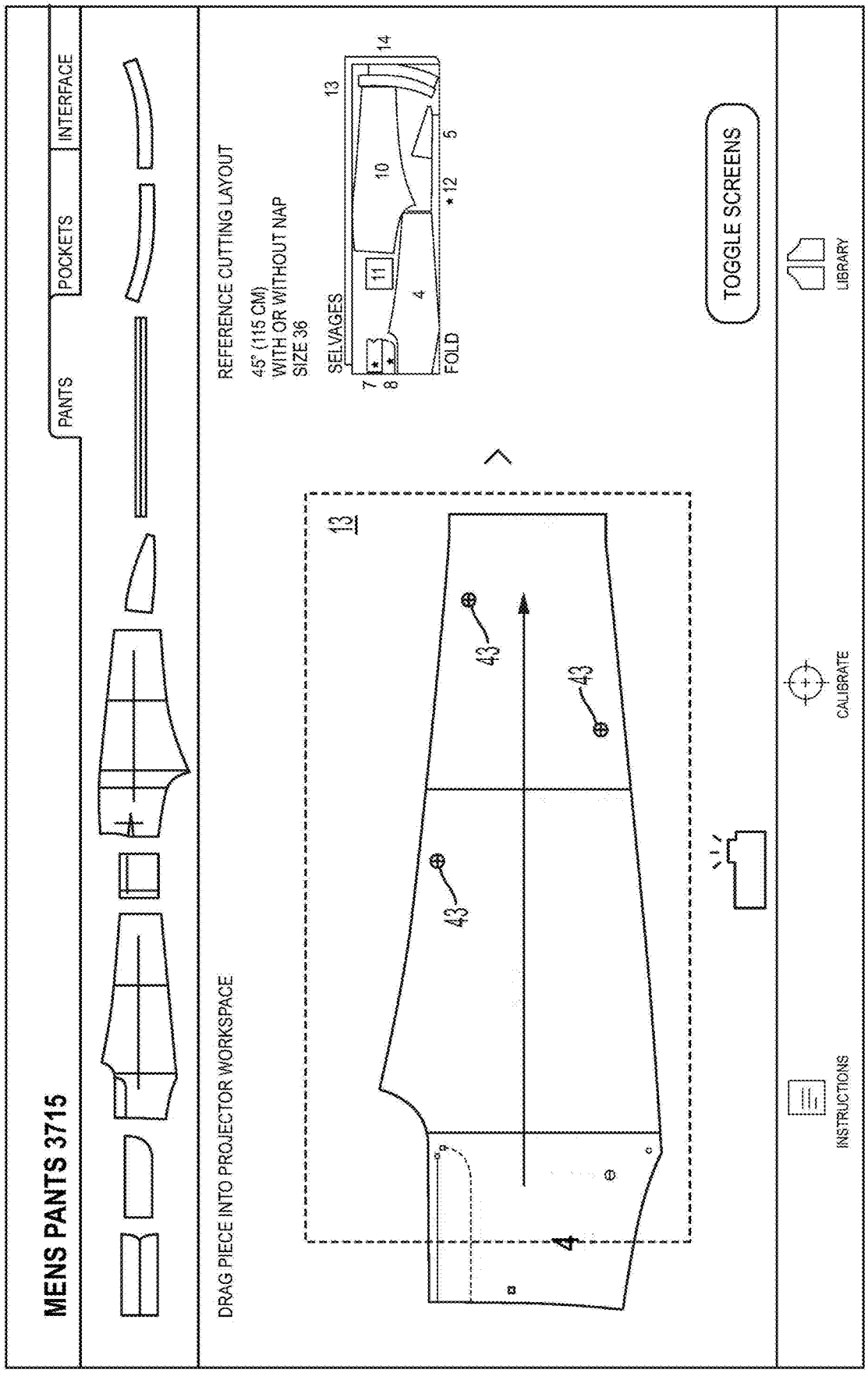
FIG. 24 illustrates an exemplary splicing method.

FIG. 24 illustrates the next projector work space. The next projection frame indicates where the marking on the fabric for the fiducials 43 need to be repositioned to for the remaining pattern portion to be cut or traced. The sewist may slide the fabric for the marked fiducial locations to correspond to the newly projected fiducial locations. The sewist may then perform marking or cutting of the pattern piece. The result is a full pattern piece that is accurate and not skewed.

Therefore, in some embodiments, a method for splicing includes simultaneously projecting onto the fabric (a) a first portion of the sewing pattern and (b) a first set of fiducials 43 adjacent an outline of the first portion. The first set of fiducials 43 are located at fixed locations relative to the sewing pattern. The method may further include instructing the user to mark or actually marking the locations of the first set of fiducials 43 on the fabric. The method may further include, thereafter, simultaneously projecting onto the fabric (c) a second portion of the sewing pattern corresponding to the sewing pattern translated along a direction and (d) the first set of fiducials 43 translated along the same direction. Finally, the method may include instructing the user to slide or actually sliding the fabric along the direction to match the marked locations of the first set of fiducials 43 on the fabric to the first set of fiducials 43 translated along the direction.

Figure 25:
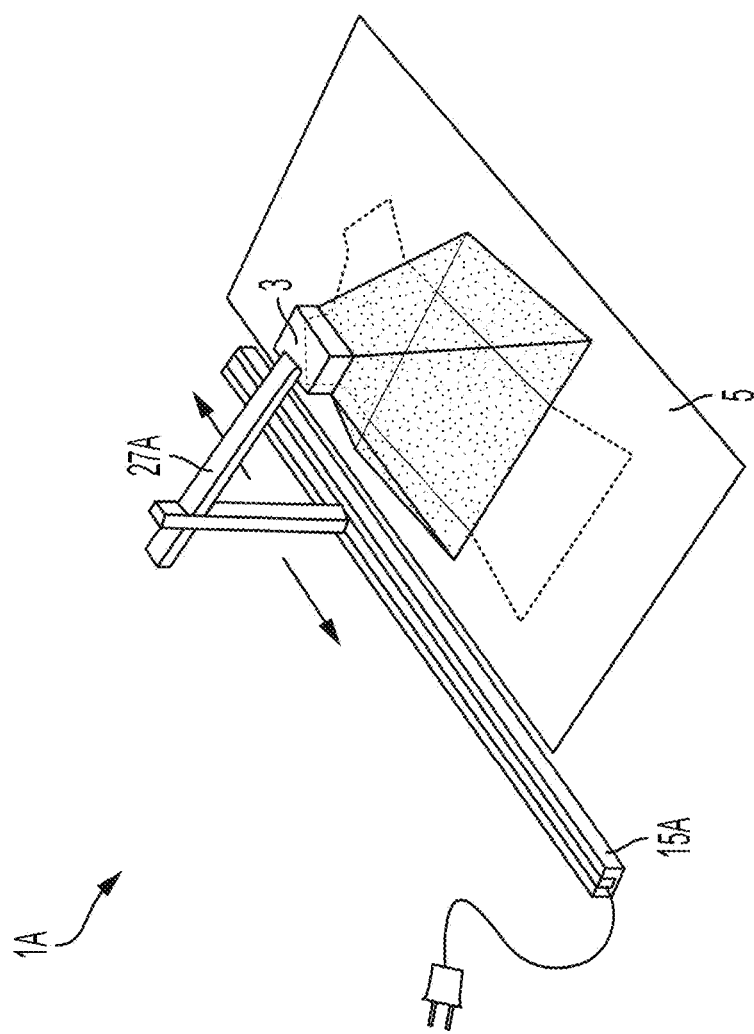
FIG. 25 illustrates an exemplary projection system for projecting sewing patterns onto fabric.

An alternative embodiment for dealing with the problem of too large (e.g., too long) pattern pieces may involve horizontally moving the projector 3. FIG. 25 illustrates an exemplary projection system 1A for projecting sewing patterns onto fabric. The system 1A is similar to the system 1 described above. However, in system 1A, the projector mounting mechanism includes a horizontal beam 15A and cart 27A slidably attached to the horizontal beam 15A and configured to slide horizontally along the horizontal beam 15A to translate the projector 3 horizontally above the surface 5. In the illustrated embodiment, the cart 27A includes a vertical arm to raise the projector 3 above the surface 5 and a horizontal arm to locate the projector 3 straight above the surface 5. In other embodiments, the cart 27A does not include either the vertical arm (e.g., may use horizontal beam 15A) or the horizontal arm (e.g., may use offset lens).

In this embodiment, instead of the fabric moving horizontally as in the embodiment of FIGS. 23-24, the projector 3 moves horizontally. The projector 3 firstly projects onto the fabric a first portion of the sewing pattern when the cart 27A carries the projector at a first horizontal position and secondly projects a second portion of the sewing pattern when the cart 27A carries the projector at a second horizontal position. The sewist may continue to move the projector 3 along the horizontal beam 15A until the whole pattern piece has been marked or cut.

Figure 26A:
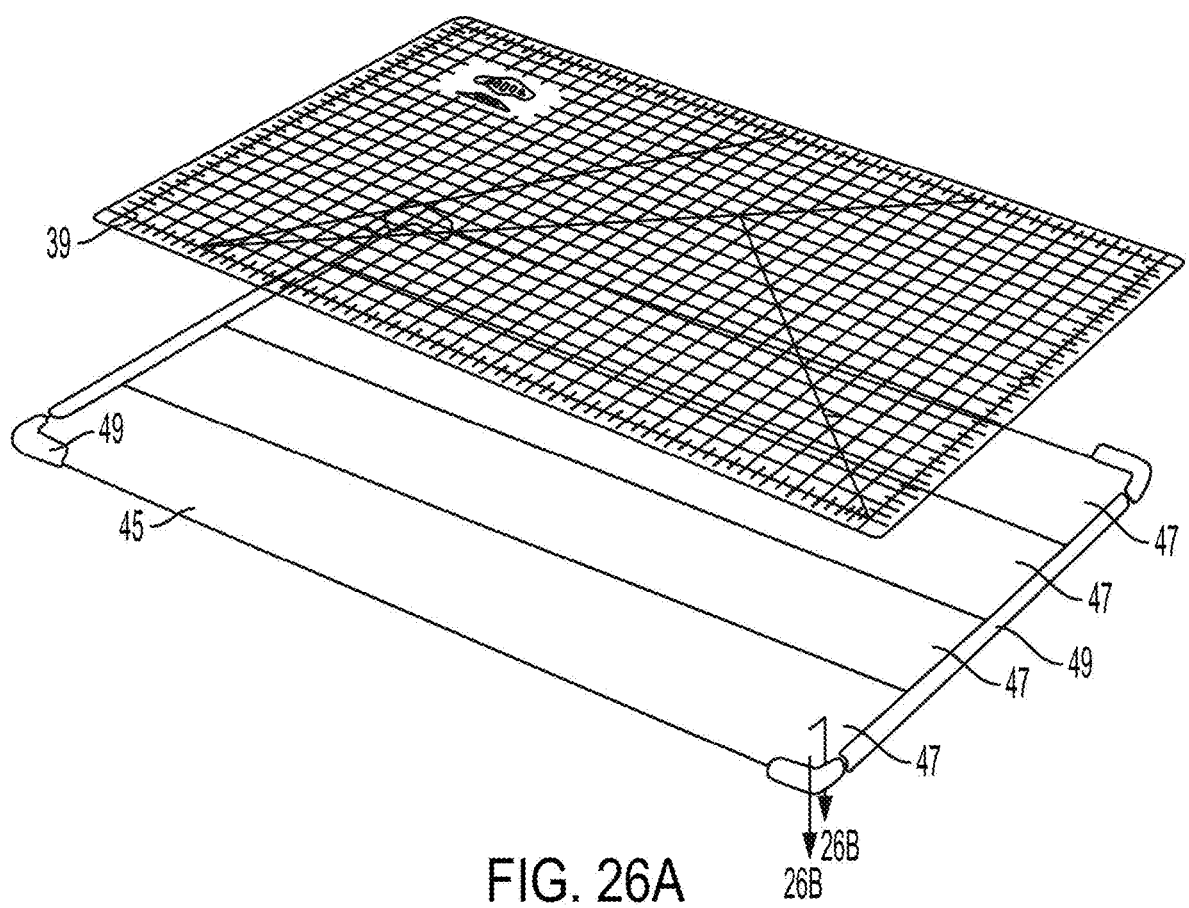
FIGS. 26A-26B illustrate an exemplary cutting mat underlay.

Another potential problem with the system 1 concerns conventional cutting mats, which often allow pieces of fabric to slide or move during the marking or cutting process. FIG. 26A illustrates a cutting mat underlay 45, which is made of a magnetic material (e.g., ferrous metal, ferrous powder dispersed in a polymer substrate, etc.) that is itself a magnet or is attracted to magnets and may be placed on the working surface 5. A cutting mat (such as calibration guide 39) could be then placed on top of the underlay 45. Fabric placed above the cutting mat underlay 45 may be retained in place by using magnets (with or without the use of a cutting mat). Magnets could then be placed on top of the fabric or material to hold it in place and prevent the material from moving during cutting or tracing. When strong enough magnets are used, pieces of fabric will not slide or move when being marked or cut. In the example of FIG. 26A a plastic guide mat (e.g., calibration guide 39) may also be provided to be placed above the underlay 45, below the fabric. When strong enough magnets are used, the fabric may be held down on top of the cutting mat/calibration guide 39 as the magnets are capable of retaining the fabric and the mat in place when magnetized to the underlay 45.

The cutting mat underlay 45 is not made of a single piece of magnetic material, however. The underlay 45 is instead made from a plurality of magnetic material pieces 47. One or more retaining contraptions 49 retain the plurality of magnetic material pieces 47 together as one cutting mat underlay 45. These retaining contraptions 49 may also provide a ridge for placement of the resin based cutting mat/calibration guide 39 so as to ensure it will not slide or move.

Figure 26B:
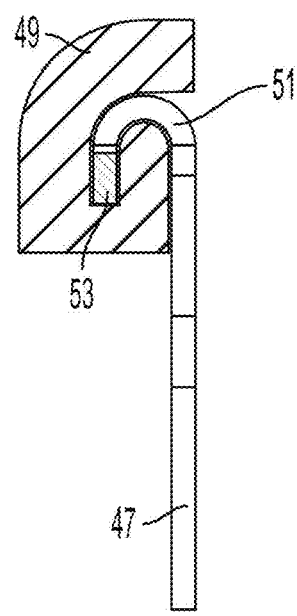

In the embodiment of FIGS. 26A and 26B, the magnetic material pieces 47 have bent extreme edges to form a retainable cross sections 51 (see FIG. 26B) and the retaining contraptions 49 correspond to elongated frame edge pieces and corner pieces having formed thereon apertures 53 corresponding to the retainable cross sections 51 such that each of the retaining contraptions 49 engage multiple of the magnetic material pieces 47 along an edge of the cutting mat underlay 45.

Figure 27A:
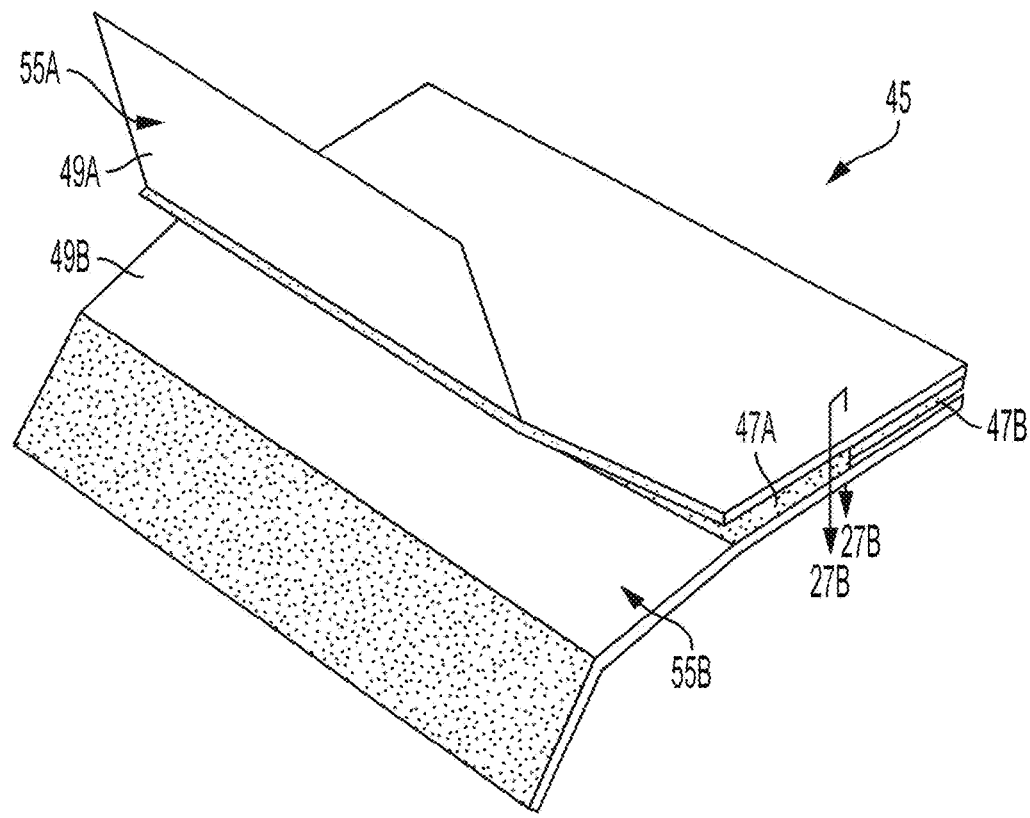
FIGS. 27A-27B illustrate another exemplary cutting mat underlay.
Figure 27B:
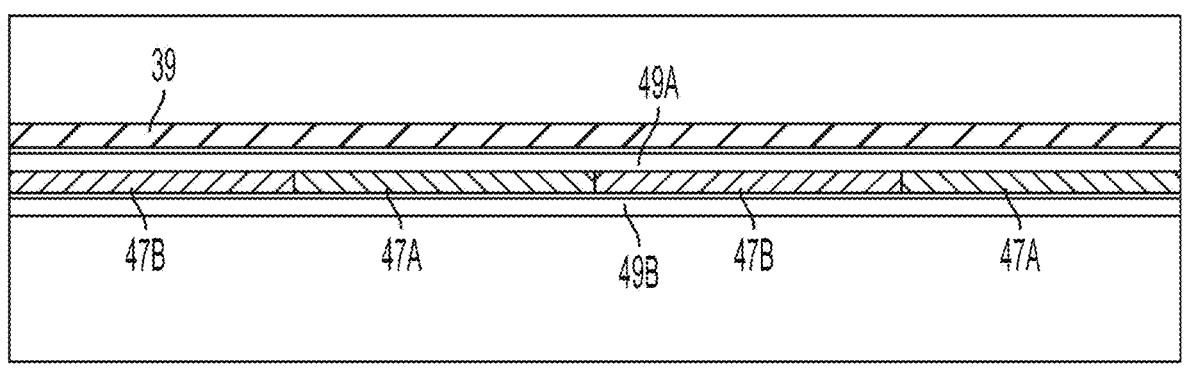

FIGS. 27A and 27B illustrate another embodiment of the cutting mat underlay 45. In the embodiment of FIGS. 27A and 27B the retaining contraptions 49 correspond to two backer layers: a first backer layer 49A and a second backer layer 49B. A first portion of the plurality of magnetic material pieces 47A is attached (e.g., adhesively or otherwise) to the first backer layer 49A with gaps 55A between magnetic material pieces 47A to form a first assembly. A second portion of the plurality of magnetic material pieces 47B is adhesively attached to the second backer layer 49B with gaps 55B between magnetic material pieces to form a second assembly. The first assembly and the second assembly may be joined with magnetic material pieces 47A of the first assembly disposed within the gaps 55B of the second assembly and magnetic material pieces 47B of the second assembly disposed within the gaps 55A of the first assembly.

Figure 28A:
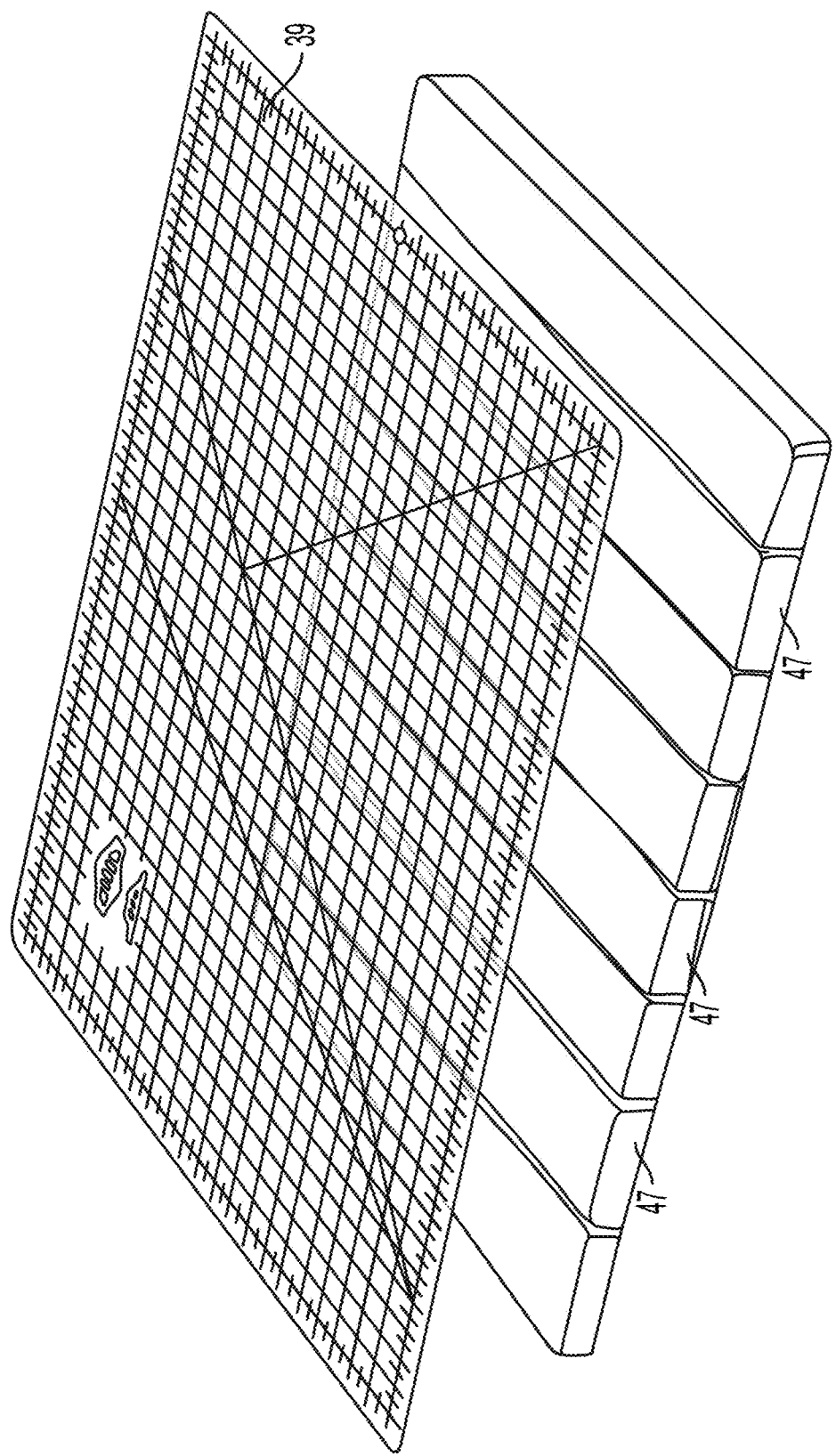
FIGS. 28A-28C illustrate yet another exemplary cutting mat underlay.
Figure 28B:
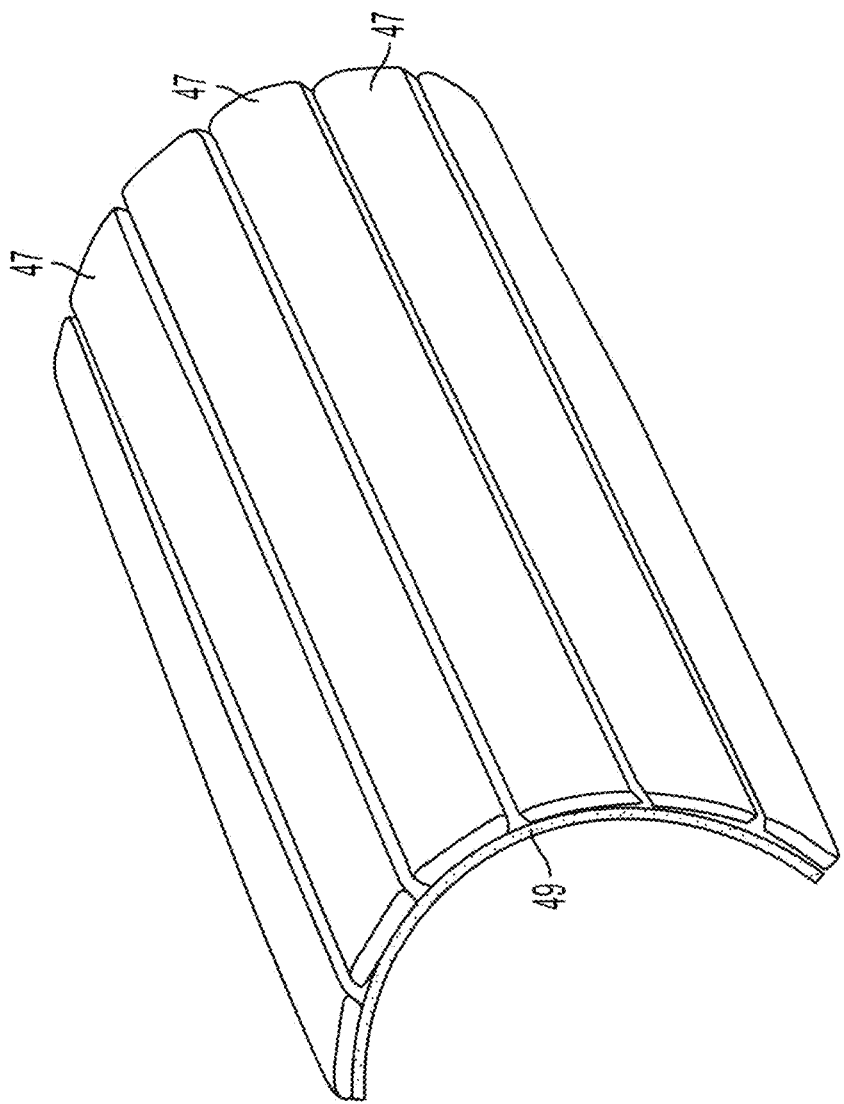
Figure 28C:
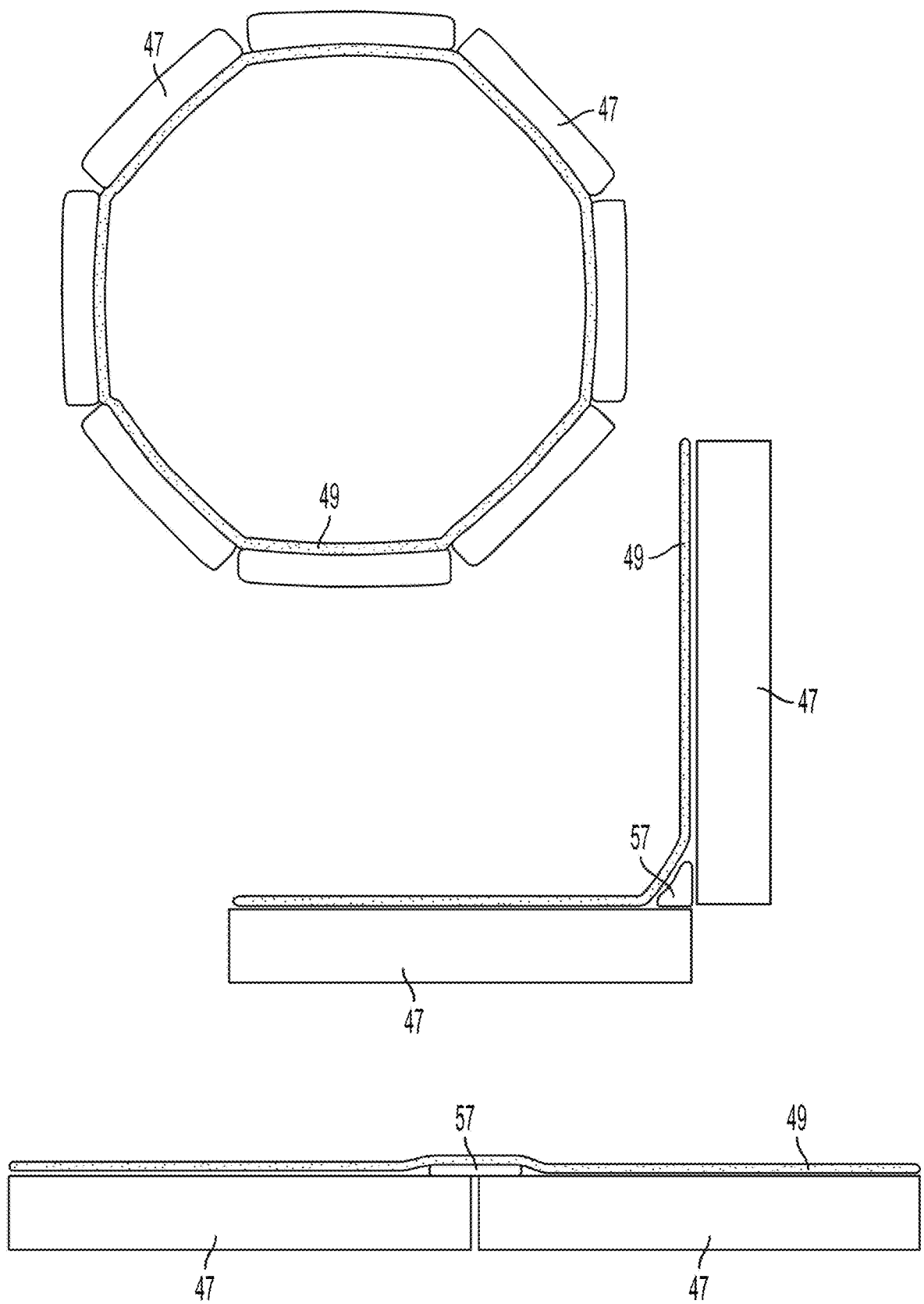

FIGS. 28A-28C illustrate another embodiment of the cutting mat underlay 45. In the embodiment of FIGS. 28A-28C the retaining contraptions 49 correspond to a flexible backer layer 49 to which the plurality of magnetic material pieces 47 is adjacently attached to form the cutting mat underlay 45. The magnetic material pieces 47 are secured to the backer layer 49 with adhesive. For example, pieces 47 may be secured to a layer 49 of strong vinyl. This embodiment may also include a mechanical connection layer 57 between pieces 47 to prevent delamination of the backer layer 49.

FIG. 29 illustrates the beam 15 disassembled and packaged for transport together with the exemplary cutting mat underlay 45.

Various embodiments include but are not limited to the following.

A projection system, including but not limited to for projecting sewing patterns onto fabric, comprises a projector, a vertical beam and a cart. The projector is configured to receive data representing the sewing patterns and to project the sewing patterns upon the fabric disposed vertically below the projector. The vertical beam includes (a) a lower beam portion including a floor engaging portion at a bottom end and (b) an upper beam portion including a ceiling engaging portion at a top end, the upper beam portion being vertically movable with respect to the lower beam portion, (c) a beam locking mechanism configured to lock the upper beam portion with respect to the lower beam portion such that the floor engaging portion and the ceiling engaging portion engage a floor and a ceiling, respectively, to anchor the projection system. The cart is operably attached to the projector, slidably attached to the vertical beam, and configured to slide vertically to adjust a height of the projector above the fabric.

The projection system as described above, wherein the projector is rotatably attached to the cart or the vertical beam such that the projector is rotatable from a vertical orientation in which an axis of projection is parallel to a length of the vertical beam to a horizontal orientation in which the axis of projection is perpendicular to the length of the vertical beam.

The projection system as described above, wherein the cart or the vertical beam includes a cart locking mechanism operable between a locked mode in which the cart locking mechanism resists vertical sliding of the cart along the vertical beam and a sliding mode in which the cart locking mechanism does not resist vertical sliding of the cart along the vertical beam.

The projection system as described above, wherein the vertical beam includes an electrical power path that transfers electrical power from the top end or the bottom end to the cart, the electrical power path including an electrical connector that transfers electrical power to the projector while allowing vertically sliding of the cart along the vertical beam.

The projection system as described above, wherein the vertical beam includes an electrical power path that transfers electrical power from the top end or the bottom end to the cart, the electrical power path including an electrical connector that transfers electrical power to the projector while allowing vertically sliding of the cart along the vertical beam, wherein the vertical beam includes a power switch and a light indicator, the power switch configured to interrupt electrical power flow to the projector and the light indicator configured to indicate electrical power flow to the projector.

The projection system as described above, wherein the projector is rotatably attached to the cart or the vertical beam and rotation of the projector to an angle of rotation relative to the cart or the vertical beam disconnects the projector from the cart or vertical beam.

The projection system of as described above, further comprising a spirit level slidably attached to the vertical beam and configured to slide vertically along the vertical beam, the spirit level configured to indicate whether the vertical beam is vertical or plumb.

The projection system as described above, wherein the beam locking mechanism includes a lever operably connected to a camming mechanism for, in transitioning to a locked position, mechanically moving the upper beam portion with respect to the lower beam portion, or vice versa, and locking the upper beam portion to the lower beam portion and, in transitioning to an unlocked position, release the upper beam portion from the lower beam portion.

The projection system as described above, wherein the system is configured to allow for horizontal and vertical projection of images.

A method for projecting sewing patterns onto fabric or another surface comprises positioning a vertical beam of a projecting system off an edge of a surface upon which the sewing patterns are to be projected, the vertical beam comprising (a) a lower beam portion including a floor engaging portion at a bottom end and (b) an upper beam portion including a ceiling engaging portion at a top end, the upper beam portion being vertically movable with respect to the lower beam portion, (c) a beam locking mechanism including a lever for, in transitioning to a locked position, vertically moving the upper beam portion with respect to the lower beam portion, or vice versa, and locking the upper beam portion to the lower beam portion and, in transitioning to an unlocked position, release the upper beam portion from the lower beam portion; operating the locking mechanism to the unlocked position; extending the vertical beam such that the floor engaging portion engages the floor and the ceiling engaging portion engages the ceiling; operating the lever to the locked position; applying electrical power to a projector of the projecting system, the projector operably attached to a cart slidably attached to the vertical beam and configured to slide vertically to adjust a height of the projector above the fabric; operating a cart locking mechanism to an unlocking position to allow vertical sliding of the cart along the vertical beam; adjusting the height of the projector above the fabric; and operating the cart locking mechanism to a locking position to resist vertical sliding of the cart along the vertical beam.

The method as set forth above, further comprising, prior to operating the lever to the locked position, using a spirit level slidably connected to the vertical beam to verify the vertical beam is plumb.

The method as set forth above, wherein the adjusting the height of the projector above the fabric includes: placing a calibration guide on a surface on which the fabric will rest; and raising or lowering the cart along the vertical beam such that a calibration frame displayed by the projector aligns with the calibration guide.

The method as set forth above, further comprising rotating the projector from a vertical orientation in which an axis of projection is parallel to a length of the vertical beam to a horizontal orientation in which the axis of projection is perpendicular to the length of the vertical beam.

A projection system for projecting patterns onto surfaces, including but not limited to for projecting sewing patterns onto fabric, comprising a projector, a projector mounting mechanism, a calibration guide, a camera, and a controller. The projector is configured to receive data representing the sewing patterns and to project the sewing patterns upon the fabric disposed vertically below the projector. The projector mounting mechanism is operably coupled to the projector and configured to retain the projector in a position vertically above a horizontal surface on which the fabric is to rest, the projector mounting mechanism configured to mount to at least one of a ceiling fixture, a ceiling mount coupled to a ceiling above the horizontal surface, a floor stand disposed adjacent the horizontal surface, a tension pole disposed adjacent the horizontal surface, a table clamp clamped to a table including the horizontal surface, a table top stand disposed on the horizontal surface, or a wall mount coupled to a wall adjacent the horizontal surface. The calibration guide is disposed on the horizontal surface, the projector configured to project a calibration pattern upon the calibration guide. The camera is disposed in or adjacent the projector and configured to receive an image of the calibration pattern as projected onto the calibration guide. The controller is operably connected to the projector and the camera and configured to progressively adjust at least one of position, scale, or skew of the calibration pattern based on the image to obtain a best match of the calibration pattern to the calibration guide and thereby calibrate the projector.

A vertical beam system, comprising a vertical beam, a cart, and an electrical power path. The vertical beam includes (a) a lower beam portion including a floor engaging portion at a bottom end and (b) an upper beam portion including a ceiling engaging portion at a top end, the upper beam portion being vertically movable with respect to the lower beam portion, (c) a beam locking mechanism for locking the upper beam portion with respect to the lower beam portion such that the floor engaging portion and the ceiling engaging portion engage a floor and a ceiling, respectively, to anchor the projection system. The cart is slidably attached to the vertical beam and configured to receive a powered device, the cart configured to slide vertically to adjust a height of the powered device above the floor. The electrical power path transfers electrical power from the top end or the bottom end to the cart, the electrical power path including an electrical connector that transfers electrical power to the powered device while allowing vertically sliding of the cart along the vertical beam.

The vertical beam system as described above, wherein the power device is selected from the group consisting of: a light, a laser level, and a speaker.

The vertical beam system as described above, wherein the powered device is rotatably attached to the cart or the vertical beam such that the powered device is rotatable from a vertical orientation to a horizontal orientation.

The vertical beam system as described above, wherein the cart or the vertical beam includes a cart locking mechanism operable between a locked mode in which the cart locking mechanism resists vertical sliding of the cart along the vertical beam and a sliding mode in which the cart locking mechanism does not resist vertical sliding of the cart along the vertical beam.

The vertical beam system as described above, wherein the vertical beam includes a power switch and a light indicator, the power switch configured to interrupt electrical power flow to the powered device and the light indicator configured to indicate electrical power flow to the powered device.

The vertical beam system as described above, further comprising a spirit level slidably attached to the vertical beam and configured to slide vertically along the vertical beam, the spirit level configured to indicate whether the vertical beam is vertical or plumb.

The vertical beam system as described above, wherein the beam locking mechanism includes a lever operable to, in transitioning to a locked position (a) longitudinally extend the vertical beam and (b) lock the upper beam portion to the lower beam portion and, in transitioning to an unlocked position, release the upper beam portion from the lower beam portion.

A cutting mat underlay to be placed under a cutting mat, comprising: a plurality of magnetic material pieces; and one or more retaining contraptions configured to retain the plurality of magnetic material pieces together as one cutting mat underlay, whereby the cutting mat and fabric may be retained atop the cutting mat underlay by magnets pinching the cutting mat and fabric to the cutting mat underlay.

The cutting mat underlay as described above, wherein the retaining contraptions correspond to two backer layers: a first backer layer and a second backer layer, a first portion of the plurality of magnetic material pieces adhesively attached to the first backer layer with gaps between magnetic material pieces to form a first assembly and a second portion of the plurality of magnetic material pieces adhesively attached to the second backer layer with gaps between magnetic material pieces to form a second assembly, the first assembly and the second assembly joinable with magnetic material pieces of the first assembly disposed within the gaps of the second assembly and magnetic material pieces of the second assembly disposed within the gaps of the first assembly.

The cutting mat underlay as described above, wherein the plurality of magnetic material pieces have bent extreme edges to form retainable cross sections and the retaining contraptions correspond to elongated frame edge pieces having formed thereon apertures corresponding to the retainable cross sections such that each of the retaining contraptions engage multiple of the magnetic material pieces along an edge of the cutting mat underlay.

The cutting mat underlay as described above, comprising corner pieces having formed thereon apertures corresponding to the retainable cross sections such that the corner pieces together with the retaining contraptions form a frame around the perimeter of the cutting mat underlay.

The cutting mat underlay as described above, wherein the one or more retaining contraptions correspond to a flexible backer layer to which the plurality of magnetic material pieces is adjacently attached to form the cutting mat underlay.

A method for projecting a sewing pattern onto fabric, comprising: simultaneously projecting onto the fabric (a) a first portion of the sewing pattern and (b) a first set of fiducials adjacent an outline of the first portion, the first set of fiducials located at fixed locations relative to the sewing pattern; instructing a user to mark or marking locations of the first set of fiducials on the fabric; thereafter, simultaneously projecting onto the fabric (c) a second portion of the sewing pattern corresponding to a translation of the sewing pattern along a direction and (d) the first set of fiducials translated along the direction; and instructing a user to slide or sliding the fabric along the direction to match the marked locations of the first set of fiducials on the fabric to the first set of fiducials translated along the direction.

The method as set forth above, wherein the markings of the locations correspond to at least one of stickers or chalk.

The method as set forth above, further comprising: prior to projecting the second portion, instructing the user to cut or trace or cutting or tracing the first portion of the sewing pattern on the fabric, and after instructing the user to slide or sliding the fabric, instructing the user to cut or trace or cutting or tracing the second portion of the sewing pattern on the fabric.

A projection system for projecting sewing patterns onto fabric, comprising a projector and a projector mounting system. The projector is configured to receive data representing the sewing patterns and to project the sewing patterns upon the fabric disposed vertically below the projector. The projector mounting mechanism operably coupled to the projector and configured to retain the projector in a position vertically above a horizontal surface on which the fabric is to rest. The projector mounting mechanism includes a horizontal track and a cart operably attached to the projector, slidably attached to the horizontal track, and configured to slide horizontally along the horizontal track to translate the projector horizontally above the fabric. The projector is configured to project onto the fabric a first portion of the sewing pattern when the cart carries the projector at a first horizontal position and to project a second portion of the sewing pattern, different from the first portion, when the cart carries the projector at a second horizontal position, different from the first horizontal position.

The projection system as set forth above, wherein the projector mounting mechanism is configured to mount to at least one of a ceiling fixture, a ceiling mount coupled to a ceiling above the horizontal surface, a floor stand disposed adjacent the horizontal surface, a tension pole disposed adjacent the horizontal surface, a table clamp clamped to a table including the horizontal surface, a table top stand disposed on the horizontal surface, or a wall mount coupled to a wall adjacent the horizontal surface.

A method for projecting sewing patterns onto fabric, comprising: projecting onto the fabric a first portion of a sewing pattern when a projector is at a first horizontal position above the fabric; controlling a projector translating mechanism to translate the projector from the first horizontal position to a second horizontal position, different from the first horizontal position; and projecting onto the fabric a second portion of the sewing pattern, different from the first portion when the projector is at the second horizontal position, different from the first horizontal position.

A method for calibrating a projector having a field of projection comprises the steps of: placing a physical calibration guide within the field of projection, the physical calibration guide including first optical calibration features; projecting a calibration image by the projector onto the physical calibration guide, the calibration image including second optical calibration features; acquiring an image including the first and second optical calibration features; determining a camera transform from the first optical calibration features in the camera image; applying an inverse transform of the camera transform to the second optical calibration features in the camera image to obtain inverse second optical calibration features; and determining a projector transform from the inverse second optical calibration features.

The projector calibration method as set forth above, wherein the step of determining the camera transform further comprises the steps of: sampling rows and columns of pixels of the acquired image including the first and second optical calibration features; detecting changes in light intensity in the sampled rows and columns of pixels; storing detected changes in light intensity as raw points; assembling raw points into lines; determining feature points from intersections of assembled lines; determining a starting point based on a subset of feature points corresponding to the first optical calibration features and a reference of the physical calibration guide; and iteratively determining a camera transform based on starting point and feature points corresponding to the first optical calibration features.

The projector calibration method as set forth above, wherein the calibration image is stored in a computing device in operative communication with the projector, and wherein the step of projecting a calibration image by the projector further comprises the step of the computing device transferring the calibration image to the projector.

The projector calibration method as set forth above, wherein the computing device includes a camera, and wherein the step of acquiring an image including the first and second optical calibration features comprises using the computing device to acquire the image.

A method of projecting a calibrated image onto a surface, comprising the steps of: determining a projector transform; applying the projector transform to an image to be projected; and projecting the image, wherein the projector transform is determined by any of the preceding projector calibration methods.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

"Data store" or "database," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities. A "data store" may refer to local storage or remote (e.g., cloud storage).

"Logic," as used herein, includes but is not limited to hardware, firmware, software or combinations of each to perform a function(s) or an action(s), or to cause a function or action from another logic, method, or system. For example, based on a desired application or needs, logic may include a software-controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

"Signal," as used herein, includes but is not limited to one or more electrical or optical signals, analog or digital signals, data, one or more computer or processor instructions, messages, a bit or bit stream, or other means that can be received, transmitted, or detected.

In the context of signals, an "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components. An "operable connection," or a connection by which entities are "operably connected," is one by which the operably connected entities or the operable connection perform its intended purpose. An operable connection may be a direct connection or an indirect connection in which an intermediate entity or entities cooperate or otherwise are part of the connection or are in between the operably connected entities.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (3D. Ed. 1995).

What is claimed is:

1. A projection system for projecting sewing patterns onto a surface, comprising:
    a vertical beam including (a) a floor engaging portion at a bottom end and (b) a ceiling engaging portion at a top end, the ceiling engaging portion being vertically movable with respect to the floor engaging portion such that, when in use, the floor engaging portion and the ceiling engaging portion engage a floor and a ceiling, respectively, to anchor the projection system adjacent the surface;
    a projector configured to receive data representing the sewing patterns and to project the sewing patterns;
    a cart slidably attached to the vertical beam, wherein the projector is rotatably attached to the cart and rotation of the projector to an angle of rotation relative to the cart disconnects the projector from the cart; and
    wherein sliding the cart vertically adjusts a height of the projector above the surface.

2. The projection system of claim 1, wherein the cart or the vertical beam includes a cart locking mechanism operable between a locked mode in which the cart locking mechanism resists vertical sliding of the cart along the vertical beam and a sliding mode in which the cart locking mechanism does not resist vertical sliding of the cart along the vertical beam.

3. The projection system of claim 1, wherein the cart has a friction fit with the vertical beam in which the friction resists vertical sliding of the cart along the vertical beam.

4. The projection system of claim 1, further comprising a computing device having a plurality of patterns stored thereon, wherein the computing device communicates selected patterns to the projector for projection.

5. The projection system of claim 4, wherein the patterns stored on the computing device comprise at least one calibration pattern and at least one sewing pattern.

6. The projection system of claim 4, wherein the computing device is configured to connect to a Wi-Fi access point on a computer network, and the computing device is further configured to connect to the projector via a Bluetooth interface and provide credentials for the Wi-Fi access point to the projector via the Bluetooth interface.

7. The projection system of claim 6, wherein the computing device is configured to transmit patterns to the projector via the Wi-Fi access point.

8. The projection system of claim 1, wherein the vertical beam includes an electrical power path that transfers electrical power along the length of the vertical beam to the cart, the electrical power path including electrical rails that transfer electrical power to the cart while allowing vertical sliding of the cart along the vertical beam, and wherein the cart couples the electrical power to the projector.

9. The projection system of claim 8, wherein the vertical beam includes a power switch configured to interrupt electrical power flow to the projector.

10. The projection system of claim 1, further comprising a spirit level slidably attached to the vertical beam and configured to slide vertically along the vertical beam, the spirit level configured to indicate whether the vertical beam is plumb.

11. The projection system of claim 1, wherein the projector is rotatably attached to the cart such that the projector is rotatable from a vertical orientation in which an axis of projection is parallel to a length of the vertical beam to a horizontal orientation in which the axis of projection is perpendicular to the length of the vertical beam.

12. The projection system of claim 1, wherein the vertical beam is separable into two portions to facilitate storage or transport of the projection system.

13. The projection system of claim 1, wherein the vertical beam further comprises a spring-biased telescoping portion to bias the vertical beam against the floor and ceiling.

14. The projection system of claim 13, wherein the floor engaging portion is disposed on the spring-biased telescoping portion.

15. The projection system of claim 1, further comprising a cutting mat having visible features for assisting in positioning of the projector at a desired distance from the surface.

16. The projection system of claim 15, further comprising a computing device which is configured to cause the projector to project a calibration pattern onto the visible features for assisting in positioning of the projector at a desired distance from the surface.

17. The projection system of claim 1, further comprising a computing device having a transform library stored thereon, wherein the computing device applies a projector transform from the transform library to a selected pattern prior to communicating the transformed selected pattern to the projector for projection.

18. The projection system of claim 17, wherein the computing device generates the projector transform from a camera image including first optical features from a physical calibration guide and second optical features from a projected calibration pattern.

19. A projection system for projecting sewing patterns onto a surface, comprising:
   a vertical beam including (a) a floor engaging portion at a bottom end and (b) a ceiling engaging portion at a top end, the ceiling engaging portion being vertically movable with respect to the floor engaging portion such that, when in use, the floor engaging portion and the ceiling engaging portion engage a floor and a ceiling, respectively, to anchor the projection system adjacent the surface;
   a projector configured to receive data representing the sewing patterns and to project the sewing patterns;
   a cart slidably attached to the vertical beam, wherein the projector is attached to the cart, and wherein sliding the cart vertically adjusts a height of the projector above the surface; and
   a computing device having a transform library stored thereon, wherein the computing device applies a projector transform from the transform library to a selected pattern prior to communicating the transformed selected pattern to the projector for projection; and wherein the computing device generates the projector transform from a camera image including first optical features from a physical calibration guide and second optical features from a projected calibration pattern.

20. The projection system of claim 19, further wherein the computing device has a plurality of patterns stored thereon, wherein the computing device communicates selected patterns to the projector for projection.

21. The projection system of claim 20, wherein the patterns stored on the computing device comprise at least one calibration pattern and at least one sewing pattern.

22. The projection system of claim 20, wherein the computing device is configured to connect to a Wi-Fi access point on a computer network, and the computing device is further configured to connect to the projector via a Bluetooth interface and provide credentials for the Wi-Fi access point to the projector via the Bluetooth interface.

23. The projection system of claim 22, wherein the computing device is configured to transmit patterns to the projector via the Wi-Fi access point.

* * * * *